(12) United States Patent
Steffan et al.

(10) Patent No.: US 10,038,575 B1
(45) Date of Patent: Jul. 31, 2018

(54) DECISION FEEDBACK EQUALIZER WITH POST-CURSOR NON-LINEARITY CORRECTION

(71) Applicant: STMicroelectronics S.r.l., Agrate Brianza (MB) (IT)

(72) Inventors: Giovanni Steffan, Pordenone (IT); Augusto Andrea Rossi, Pavia (IT); Emanuele Depaoli, Pavia (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 15/692,202

(22) Filed: Aug. 31, 2017

(51) Int. Cl.
| H04L 25/03 | (2006.01) |
| H04L 25/06 | (2006.01) |
| H04L 27/06 | (2006.01) |
| H04L 27/20 | (2006.01) |

(52) U.S. Cl.
CPC .. *H04L 25/03057* (2013.01); *H04L 25/03203* (2013.01); *H04L 25/03267* (2013.01); *H04L 25/06* (2013.01); *H04L 27/06* (2013.01); *H04L 27/2017* (2013.01)

(58) Field of Classification Search
CPC ............... H04L 25/03057; H04L 25/06; H04L 25/03203; H04L 27/06; H04L 25/03267; H04L 27/2017
See application file for complete search history.

(56) References Cited

U.S. PATENT DOCUMENTS

| 6,370,190 | B1* | 4/2002 | Young | H04L 25/03057 |
| | | | | 341/110 |
| 8,971,395 | B2* | 3/2015 | Huang | H04L 25/03057 |
| | | | | 375/233 |
| 2005/0084028 | A1* | 4/2005 | Yu | H04L 25/03057 |
| | | | | 375/267 |
| 2013/0287088 | A1* | 10/2013 | Mobin | H04L 7/10 |
| | | | | 375/233 |

OTHER PUBLICATIONS

Bassi, M. et al.; "A High-Swing 45 Gb/s Hybrid Voltage and Current-Mode PAM-4 Transmitter in 28 nm CMOS FDSOI"; IEEE Journal of Solid-State Circuits, vol. 51, No. 11, Nov. 2016; 14 pages.

(Continued)

*Primary Examiner* — Dac Ha
(74) *Attorney, Agent, or Firm* — Slater Matsil, LLP

(57) ABSTRACT

In some embodiments, a DFE including: an input terminal configured to receive an input signal carrying a plurality of symbols; an adder circuit coupled to the input terminal of the DFE; a plurality of comparator circuits configured to receive respective threshold signals; a plurality of slicer circuits coupled to respective comparator circuits of the plurality of comparator circuits; and a plurality of multiplier circuits coupled to respective slicer circuits of the plurality of slicer circuits, the plurality of multiplier circuits configured to multiply respective correction coefficients of a plurality of correction coefficients times respective outputs of respective slicer circuits to produce respective multiplication results of a plurality of multiplication results, where: the adder circuit (Continued)

is configured to subtract the plurality of multiplication results from the input signal, and the plurality of correction coefficients are independently adjusted based on a previously received symbol.

35 Claims, 12 Drawing Sheets

(56) References Cited

OTHER PUBLICATIONS

Elhadidy, O. et al.; "A 32 Gb/s 0.55 mW/Gbps PAM4 1-FIR 2-IIR Tap DFE Receiver in 65-nm CMOS"; Analog and Mixed-Signal Center, Texas A&M University, College Station, TX; 2015 Symposium on VLSI Circuits Digest of Technical Papers; 2 pages.

Im, J. et al.; "A 40-to-56Gb/s PAM-4 Receiver with 10-Tap Direct Decision-Feedback Equalization in 16nm FinFET"; ISSCC 2017/ Session 6/ Ultra-High-Speed Wireline/ 6.3; Xilinx; 2017 IEEE International Solid-State Circuits Conference: 3 pages.

Kim, et al.; "A 20 Gbps 1-Tap Decision Feedback Equalizer with Unfixed Tap Coefficient"; Dept. of Electrical Engineering KAIST; 2012 IEEE; 4 pages.

Schinkel, D. et al.; "A Double-Tall Latch-Type Voltage Sense Amplifier with 18ps Setup+Hold Time"; ISSCC 2007/ Session 17/ Analog Techniques and PLLs/ 17.7; University of Twente, Enschede, The Netherlands; 2007 IEEE International Solid-State Circuits Conference; 3 pages.

Yuan, F. et al.: "Design Techniques for Decision Feedback Equalisation of Multi-giga-bit-per-second Serial Data Links: a State-of-the-Art Review"; www.ietdl.org; ISSN 1751-858X; The Institution of Engineering and Technology 2014; IET Circuits Devices Syst., 2014, vol. 8, Iss. 2, pp. 118-130.

\* cited by examiner

DECISION FEEDBACK EQUALIZER WITH POST-CURSOR NON-LINEARITY CORRECTION

TECHNICAL FIELD

The present invention relates to signal equalization techniques, and in particular embodiments to distortions and non-linearity correction in receivers incorporating a decision feedback equalizer.

BACKGROUND

A communication system typically includes a transmitter (TX), a receiver (RX) and a lossy transmission channel. For example, FIG. 1 shows exemplary communication system 100 including transmitter 102, receiver 106, and channel 104. During normal operation, transmitter 102 typically encodes data to be transmitted into symbols and sends the encoded symbols through channel 104. Receiver 106 typically receives the encoded symbols from channel 104 and decodes the symbols.

The symbols may be encoded in many different ways. For example, pulse-amplitude modulation (PAM) may be used. An example of PAM having two levels (PAM-2) is non-return to zero (NRZ) modulation. NRZ is a binary code that typically represents a one by a positive voltage and a zero by a negative voltage.

To decode symbols transmitted using PAM-2, a binary data slicer is typically used. A data slicer, also known as a slicer, is a circuit that samples an analog signal (e.g., a symbol) and determines its logical value. In other words, it generates a digital signal based on the sampled analog signal. For example, a data slicer for decoding symbols generated using NRZ modulation may be implemented with a comparator that outputs 1 when the input is positive and 0 when the input is negative.

As shown in FIG. 1a, signal $S_{out}$ received by receiver 106 may be different than signal $S_{in}$ transmitted by transmitter 102. In other words, the finite bandwidth and reflections of channel 104 may modify signals as they go through the channel. Such modifications may cause the receiver to incorrectly decode the received symbols, thereby leading to higher bit error rates in the communication system.

FIGS. 1b and 1c show graphs of signals $S_{in}$ and $S_{out}$, respectively. FIG. 1b shows a pulse being transmitted by transmitter 102 at time $t_0$. FIG. 1c shows the signal being received by receiver 106 at time $t_0$. As shown in FIG. 1c, signal $S_{out}$ may be modified by channel 104. FIG. 1c may be understood as the channel pulse response (the convolution between a single pulse and the channel impulse response). In other words, coefficients $C_{-1}$, $C_0$, $C_1$, $C_2$, $C_3$, $C_4$, $C_5$, etc. may be understood as channel pulse response coefficients. For the sake of simplicity, the transmission line delay that may be associated with channel 104 has been ignored.

As shown in FIG. 1c, transmitting a symbol at time $t_0$ through channel 104 may affect subsequently received symbols through channel 104 at times $t_1$, $t_2$, $t_3$, $t_4$, $t_5$, etc. Such interference between symbols is known as inter-symbol interference (ISI). Interference associated with subsequent symbols is known as post-cursor ISI.

To reduce ISI, a receiver typically uses an equalizer such as a continuous linear equalizer (CTLE) followed by a decision feedback equalizer (DFE). The CTLE is designed to match the channels inverse transfer function. A DFE is a non-linear equalizer that uses the information from the CTLE together with detected symbols to produce an estimate of the post-cursor ISI. Such estimate is subtracted from the output to cancel ISI. FIG. 1d shows an exemplary implementation of receiver 106. Receiver 106 includes CTLE 112 and DFE 114. Variable gain amplifier (VGA) 110 may be used to adjust the amplitude of the incoming signal to optimize the dynamic range and avoid saturation.

Other modulation techniques may also be used in a communication system. For example, several standard bodies adopt multi-level modulation instead of PAM-2. For example, PAM-4 (4-level pulse amplitude modulation) has been adopted by the IEEE 802.3bs standard and the OIF CEI-56G standard. PAM-4 is a modulation technique that doubles the data rate while having the same bandwidth requirements than PAM-2. PAM-4 achieves four levels by dividing the vertical eye diagram with three thresholds. PAM-4, therefore, generates 2 bits of data per symbol received.

SUMMARY

In some embodiments, a DFE including: an input terminal configured to receive an input signal carrying a plurality of symbols; an adder circuit coupled to the input terminal of the DFE; a plurality of comparator circuits configured to receive respective threshold signals; a plurality of slicer circuits coupled to respective comparator circuits of the plurality of comparator circuits; and a plurality of multiplier circuits coupled to respective slicer circuits of the plurality of slicer circuits, the plurality of multiplier circuits configured to multiply respective correction coefficients of a plurality of correction coefficients times respective outputs of respective slicer circuits to produce respective multiplication results of a plurality of multiplication results, where: the adder circuit is configured to subtract the plurality of multiplication results from the input signal, and the plurality of correction coefficients are independently adjusted based on a previously received symbol.

BRIEF DESCRIPTION OF THE DRAWINGS

For a more complete understanding of the present invention, and the advantages thereof, reference is now made to the following descriptions taken in conjunction with the accompanying drawings, in which:

FIG. 3b shows an eye-diagram of a signal received by the DFE of FIG. 3a;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a receiver having a DFE and operating in a wireline communication system with multi-level PAM signals, such as PAM-4. Embodiments of the present invention may also be implemented with other wireline communications protocols, as wells as with wireless communications and wireless communication protocols.

In an embodiment of the present invention, a DFE operating with multi-level modulated signals compensates for distortion and non-linearities of the communication system by multiplying each sliced signal times an independent correction coefficients in the feedback loop. The result of the multiplication is subtracted by an adder circuit from the input signal to cancel or significantly reduce main cursor distortion and post cursor ISI. Each correction coefficient is determined using an adaptive algorithm and is varied independently and dynamically. In some embodiments, each slicer is driven by a dedicated adder.

Figure 1A:
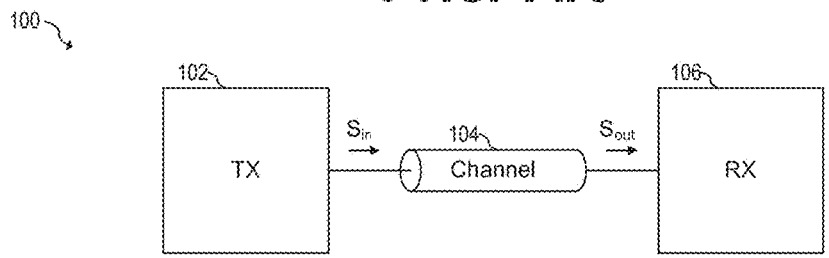
FIG. 1a shows an exemplary communication system including a transmitter, a receiver, and a channel.
Figure 1B:
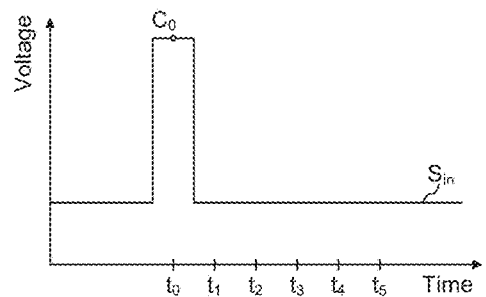
FIGS. 1b and 1c show graphs of an input signal and an output signal, respectively, of an exemplary communication system.
Figure 1C:
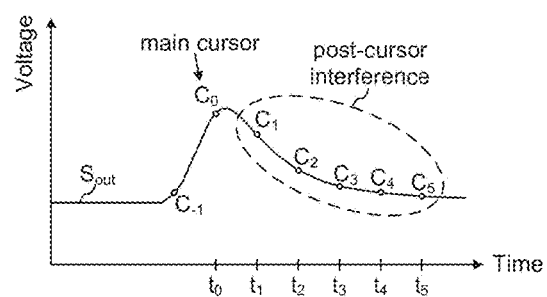
Figure 1D:
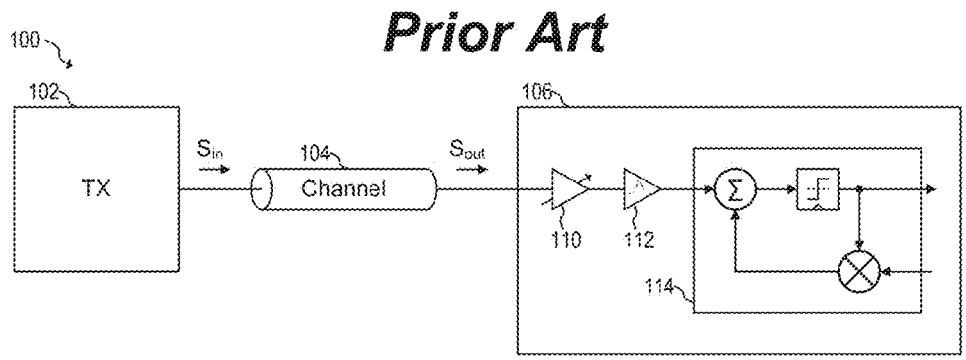
FIG. 1d shows an exemplary implementation of a receiver.
Figure 2:
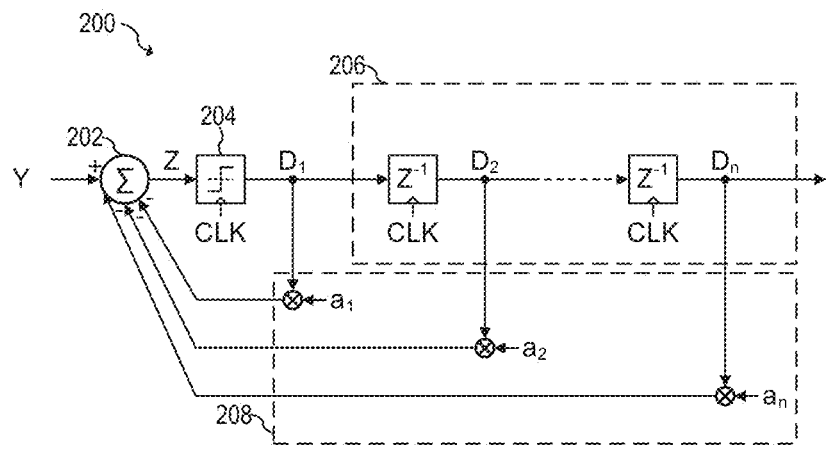
FIG. 2 shows an exemplary DFE operating with PAM-2.

DFEs are typically implemented with an adder, a slicer, and a shift register. For example, FIG. 2 shows DFE 200 operating with PAM-2. DFE 200 includes adder 202, slicer 204, shift register 206 and multipliers 208.

During normal operation, slicer 204 samples, each clock cycle, analog signal Z and generates digital signal $D_1$. Shift register 206 produces delayed copies of digital signal $D_1$. The delayed copies are weighted by respective correction coefficient $a_i$ and subtracted from input signal Y by adder 202 to produce corrected analog signal Z. Analog signal Z, therefore, may be given by $$Z = Y - \sum_{i=1}^{n} a_i \cdot D_i \quad (1)$$

Properly choosing each correction coefficient $a_i$ may cancel post-cursor ISI.

In a DFE, the slicer, such as slicer 204, is typically counted as the first delay block of the shift register. Shift register 206, therefore, may have one or more taps (delay blocks). For example, a 1-tap DFE has the delay block associated with the slicer, but has no additional delay blocks. As another example, a 3-tap DFE has the delay block associated with the slicer, and two additional delay blocks.

Figure 3A:
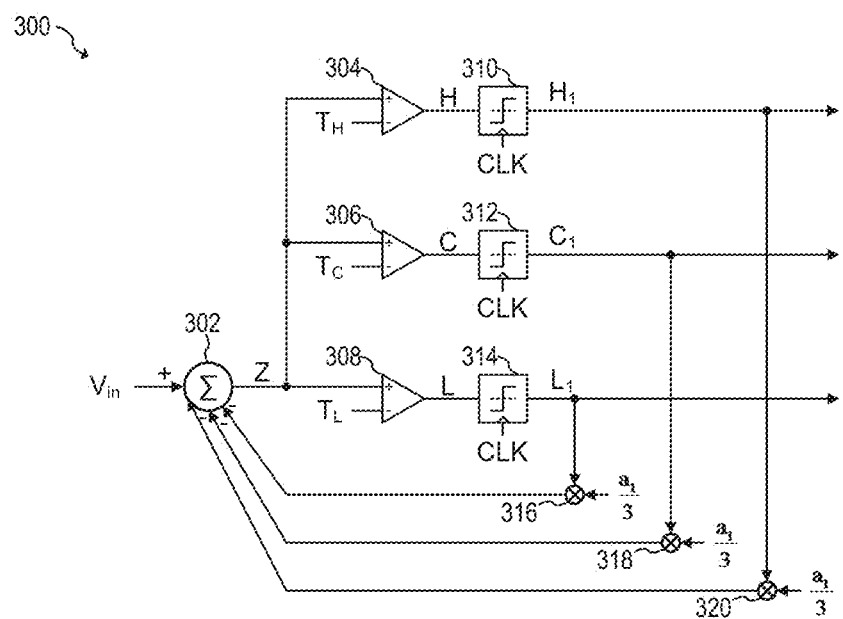
FIG. 3a shows a 1-tap DFE of a PAM-4 communication system.
Figure 3B:
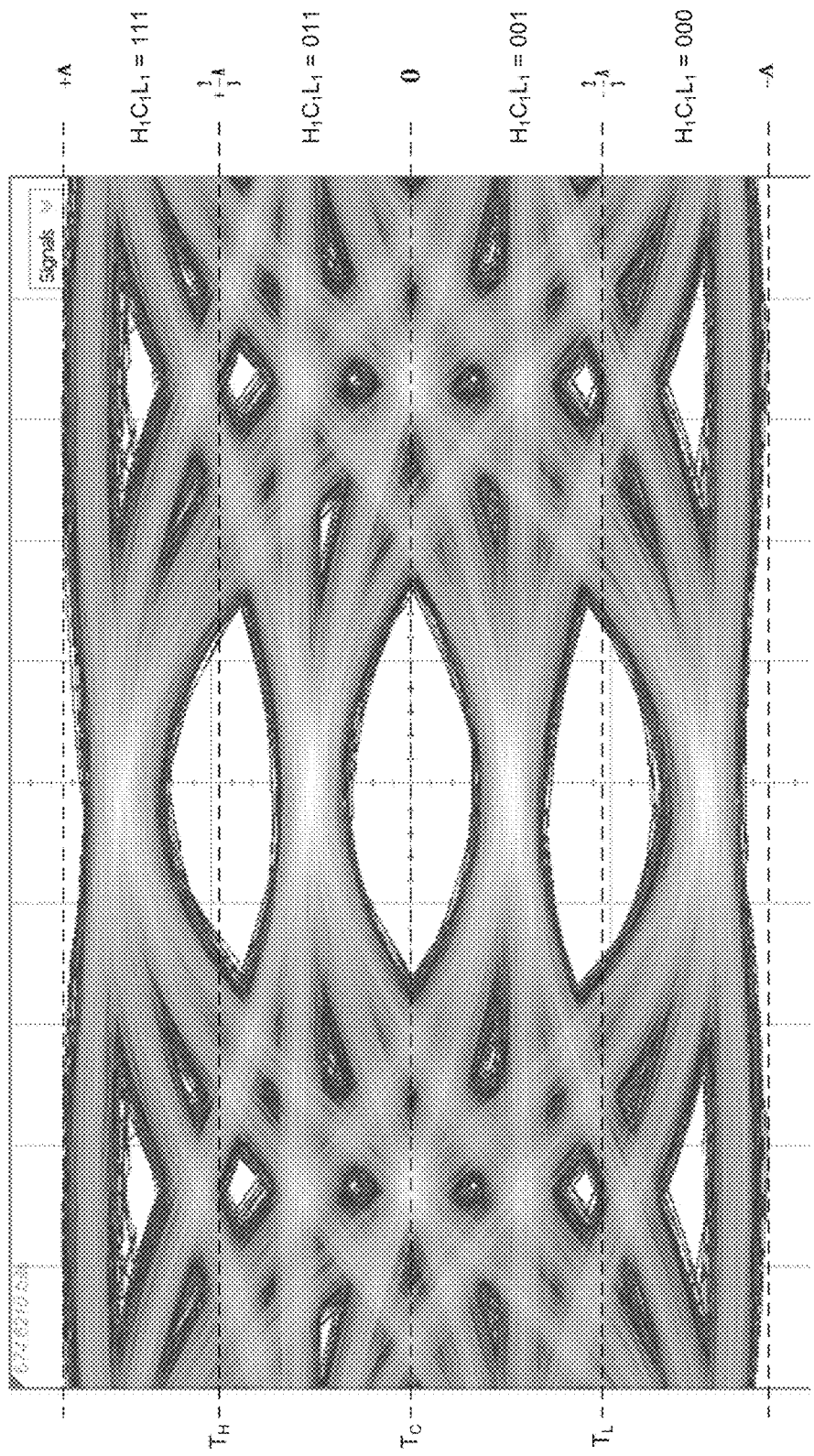

DFE architectures may be extended to operate with multi-level modulation. For example, FIG. 3*a* shows 1-tap DFE 300 of a PAM-4 communication system. FIG. 3*b* shows eye-diagram 302 of a signal received by DFE 300. FIG. 3*a* may be understood in view of FIG. 3*b*. 1-tap DFE 300 includes adder 302, comparators 304, 306, and 308, slicers 310, 312, and 314, and multipliers 316, 318, and 320.

During normal operations, analog signal Z is compared with three different thresholds by comparators 304, 306 and 308 and sliced by three dedicated slicers 310, 312, and 314 to produce three bits of data $H_1$, $C_1$, and L1. Each of the three bits of data $H_1$, $C_1$, and $L_1$ are respectively multiplied by correction coefficient $$\frac{a_1}{3}$$

and subtracted from analog input $V_{in}$ to produce analog signal Z.

The three bits of data $H_1$, $C_1$, and $L_1$ are thermometer encoded and together represent four different levels, +A, $$+A, +\frac{1}{3}A, -\frac{1}{3}A,$$

and −A. For example, when level +A is received, $H_1$, $C_1$, and $L_1$ are all equal to 1; when level +⅓A is received, $H_1$ is equal to 0, and $C_1$ and $L_1$ are equal to 1; when level $$-\frac{1}{3}A$$

A is received, $H_1$ and $C_1$ are equal to 0, and $L_1$ is equal to 1; and when level −A is received, $H_1$, $C_1$, and $L_1$ are all equal to 0. The three bits of data $H_1$, $C_1$, and $L_1$ may be applied to the feedback loop while still thermometer encoded.

Thresholds $T_H$, $T_C$, and $T_L$, which are used by comparators 304, 306, and 308, respectively, may be selected to be equal to $$+\frac{2}{3}A,$$

0, and $$-\frac{2}{3}A,$$

where A is the maximum positive voltage and −A is the maximum negative voltage. For example, if the supply voltage is 1V, A may be a number greater or equal to 100 mV and lower or equal to 500 mV.

Cancellation of post-cursor ISI may be achieved with DFE 300 by properly selecting correction coefficient $a_1$. For example, assuming for the sake of simplicity that the channel pulse response coefficients are all equal to 0 except for $C_0$ and $C_1$, the input amplitude can vary from $-A$ to $+A$, the current symbol is $S_0$, and the previous symbol is $S_1$, then $V_{in}=C_0 \cdot S_0 + C_1 \cdot S_1$. Post-cursor ISI is cancelled if $$Z = V_{in} - \frac{a_1}{3} \cdot (H_1 + C_1 + L_1) = C_0 \cdot S_0.$$

In such a case, selecting correction coefficient $a_1=c_1$ would achieve post-cursor ISI cancellation for every possible value of $S_1$, where the possible values of $S_1$ is given by $$S_1 = \left\{ A; +\frac{A}{3}; -\frac{A}{3}; -A \right\} \quad (2)$$

Figure 4A:
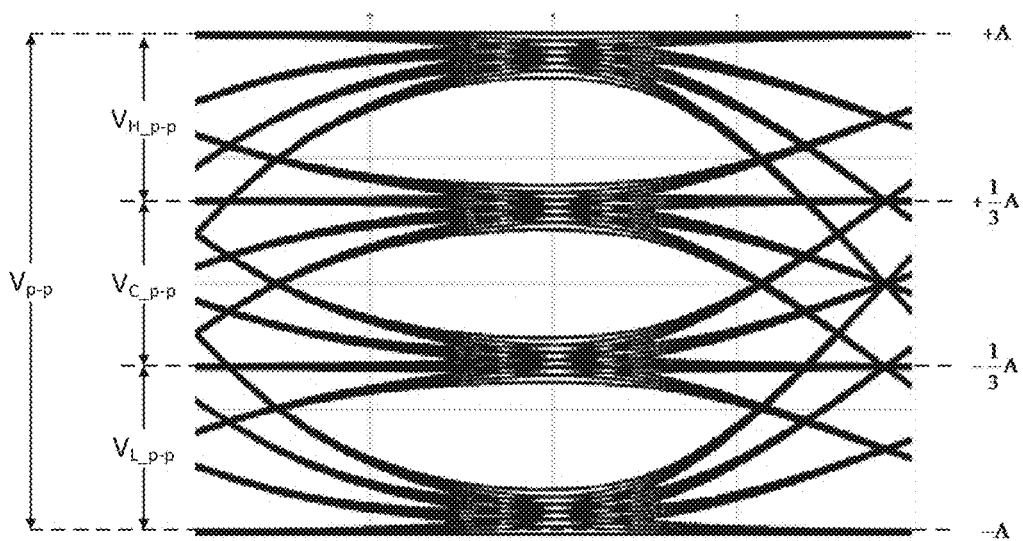
FIGS. 4a and 4b show eye diagrams of PAM-4 signals without distortion and with distortion, respectively.
Figure 4B:
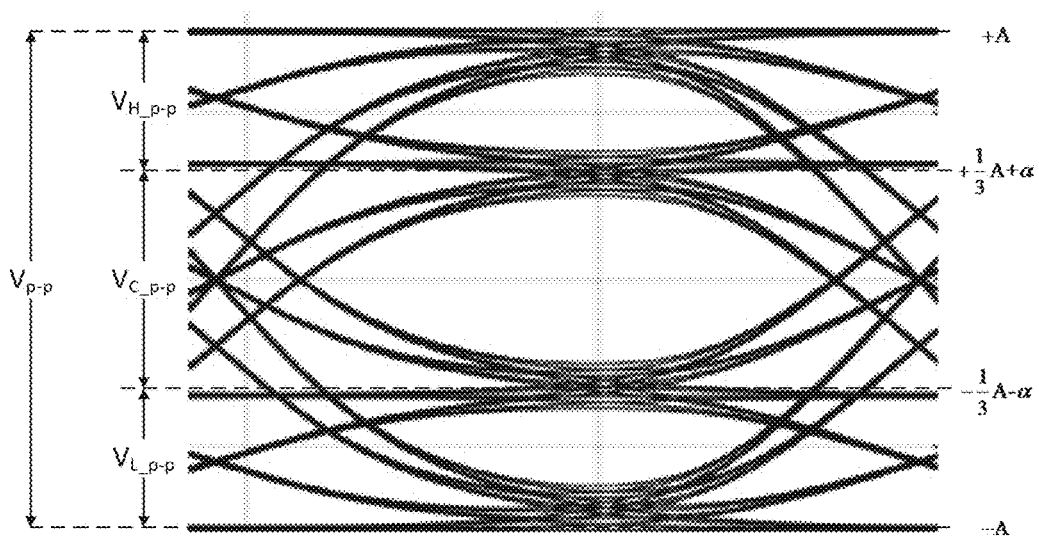

Correctly extracting symbols from multi-level modulation signals, such as PAM-4, may be more challenging than extracting symbols from NRZ modulation. For example, since the vertical eye aperture of PAM-4 signals is divided in three, the signal-to-noise ratio (SNR) is reduced by at least 9.5 dB when compare to NRZ modulation. Such problem may be exacerbated by non-linearities present in the system. For example, saturation and non-linearities of transmitters and/or receivers analog circuits may result in distorted PAM-4 signals. In such a case, symbol values may not be equally spaced. For example, FIGS. 4a and 4b show eye diagrams of PAM-4 signals without distortion and with distortion, respectively. As shown in FIG. 4a, the vertical eye apertures of non-distorted PAM-4 signals have the same amplitude. In other words, the high-eye peak-to-peak voltage $V_{H\_p-p}$ is equal to the center-eye peak-to-peak voltage $V_{C\_p-p}$ and the low-eye peak-to-peak voltage $V_{L\_p-p}$. The determination of the amplitude of each of the eyes ($V_{H\_p-p}$, $V_{C\_p-p}$, and $V_{L\_p-p}$) is typically computed using statistical analysis and is well known in the art. For example, standards, such as IEEE 802.3bs standard and the OIF CEI-56G standard describe specific test patterns to measure the amplitude of each eye.

In distorted PAM-4 signals, the vertical eye apertures of the PAM-4 signals may have different amplitudes. In other words, the peak-to-peak voltages $V_{H\_p-p}$, $V_{C\_p-p}$, and $V_{L\_p-p}$ may not be all equal to each other. For example, FIG. 4b shows the outer eyes ($V_{H\_p-p}$ and $V_{L\_p-p}$) being smaller than the center eye ($V_{C\_p-p}$). It is noted that the eye diagram shown in FIG. 4b is symmetrical with respect to the vertical axis. Non-symmetrical eye diagrams are also possible.

The ratio of level mismatch (RLM) is a metric to measure the level of distortion. The RLM metric may be calculated by $$RLM = 3 \cdot \frac{V_{min}}{V_{p-p}} \quad (3)$$

where $V_{min}$ is the smallest of the eye openings (e.g., the smallest of $V_{H\_p-p}$, $V_{C\_p-p}$, and $V_{L\_p-p}$) and $V_{p-p}$ is the peak-to-peak amplitude of the eye diagram. Standards, such as IEEE 802.3bs standard and the OIF CEI-56G standard describe methods for determining RLM.

Without distortion, such as shown in FIG. 4a, the PAM-4 communication signals may have RLM equal to 100%. With distortion, such as shown in FIG. 4b, the PAM-4 communication signals may have RLM lower than 100%. For example, the eye diagram shown in FIG. 4b has an RLM of 80%. Combined with noise, an RLM lower than 100% may impact the performance of the communication system, such as by increasing the bit error rate. For example, a signal with poor RLM may be more susceptible to noise than a signal with good RLM. The IEEE 802.3bs standard and the OIF CEI-56G standard both impose a minimum RLM of 95% for the transmitter.

A receiver having a DFE such as DFE 300 may compensate for main cursor distortion by adjusting the thresholds $T_H$, $T_C$, and $T_L$ to be in the middle of the respective eye. Distortion, however, may also occurs in post-cursor ISI. For example, assuming for the sake of simplicity that the channel pulse response coefficients are all equal to 0 except for $C_0$ and $C_1$, the input amplitude can vary from $-A$ to $+A$, the current symbol is $S_0$, and the previous symbol is $S_1$, then $V_{in}=C_0 \cdot S_0 + C_1 \cdot S_1$. Post-cursor ISI is cancelled if $$Z = V_{in} - \frac{a_1}{3} \cdot (H_1 + C_1 + L_1) = C_0 \cdot S_0.$$

In such a case, DFE 300 may not be able to perfectly cancel post-cursor ISI for every possible value of $S_1$ in a communication system with RLM lower than 100%, such as the one shown in FIG. 4b, where the possible values of $S_1$ is given by $$S_1 = \left\{ A; +\frac{A}{3} + \alpha; -\frac{A}{3} - \alpha; -A \right\} \quad (4)$$

In some embodiments, the correction coefficients are determined using least-mean-square (LMS) algorithms and are based on previous symbols as well as the current symbol. Some embodiments implement the adder circuit as a resistively loaded adder. Other embodiments implement the adder circuit as a current integrating adder.

Figure 5A:
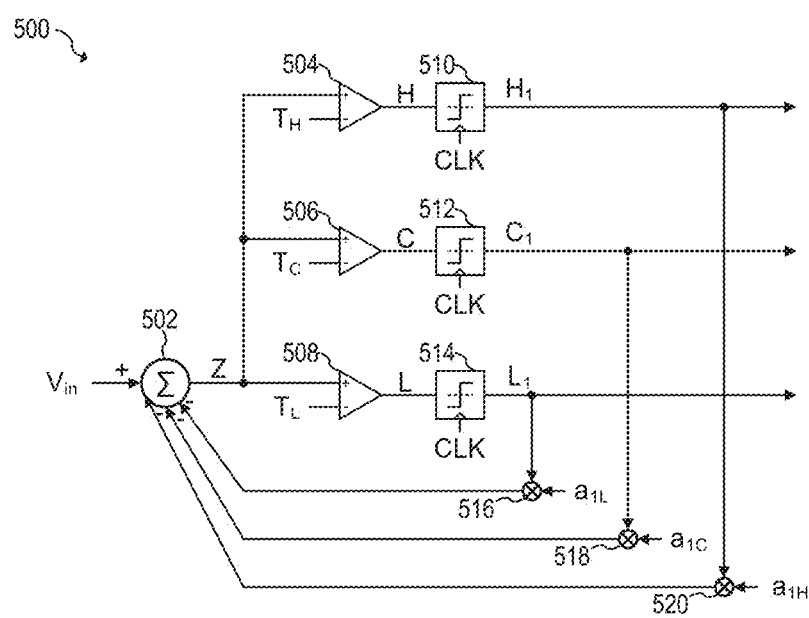
FIG. 5a shows a 1-tap DFE of a PAM-4 communication system, according to an embodiment of the present invention.

FIG. 5a shows 1-tap DFE 500 of a PAM-4 communication system, according to an embodiment of the present invention. DFE 500 may operate in a similar manner than DFE 300. DFE 500, however, multiplies each of the thermometer encoded bits ($H_1$, $C_1$, and $L_1$) times an independent correction factor that may be varied dynamically ($a_{1H}$, $a_{1C}$, and $a_{1L}$) instead of multiplying each of the thermometer encoded bits times a correction factor divided by three $$\left( \frac{a_1}{3} \right).$$

DFE 500 is capable of correcting post-cursor ISI that is attributed to non-linearities and distortion of the communication system. For example, assuming for the sake of simplicity that the channel pulse response coefficients are all equal to 0 except for $C_0$ and $C_1$, the input amplitude can vary from $-A$ to $+A$, the current symbol is $S_0$, and the previous symbol is $S_1$, then $V_{in}=C_0 \cdot S_0 + C_1 \cdot S_1$. Post-cursor ISI is cancelled if $Z=V_{in}-a_{1H} \cdot H_1 - a_{1C} \cdot C_1 - a_{1L} \cdot L_1 = C_0 \cdot S_0$. It is then possible to obtain a system of equation with three equations and three unknowns, given by $$\begin{cases} C_1 = a_{1H} + a_{1C} + a_{1L} & (5) \\ C_1 \cdot \left(\frac{1}{3} + \alpha\right) = -a_{1H} + a_{1C} + a_{1L} \\ -C_1 \cdot \left(\frac{1}{3} + \alpha\right) = -a_{1H} - a_{1C} + a_{1L} \end{cases}$$

where the first equation is valid when $S_1 = +A$, the second equation is valid when $$S_1 = +A \cdot \left(\frac{1}{3} + \alpha\right),$$

and the third equation is valid when $$S_1 = -A \cdot \left(\frac{1}{3} + \alpha\right).$$

The correction coefficients $a_{1H}$, $a_{1C}$, and $a_{1L}$ may be determined using, for example, an LMS algorithm based on the value of the S symbol. For example, $a_{1H}$ may be updated when $S_1 = +A$; $a_{1C}$ may be updated when $$S_1 = +A \cdot \left(\frac{1}{3} + \alpha\right);$$

and $a_{1L}$ may be updated when $$S_1 = -A \cdot \left(\frac{1}{3} + \alpha\right).$$

It is understood that DFE 500 may be extended to operate with non-symmetrical eye diagrams. In such a case, Equation 5 may become $$\begin{cases} C_1 = a_{1H} + a_{1C} + a_{1L} & (6) \\ C_1 \cdot \left(\frac{1}{3} + \alpha\right) = -a_{1H} + a_{1C} + a_{1L} \\ -C_1 \cdot \left(\frac{1}{3} + \beta\right) = -a_{1H} - a_{1C} + a_{1L} \end{cases}$$

where the first equation is valid when $S_1 = +A$, the second equation is valid when $$S_1 = +A \cdot \left(\frac{1}{3} + \alpha\right),$$

and the third equation is valid when $$S_1 = -A \cdot \left(\frac{1}{3} + \beta\right).$$

The correction coefficients $a_{1H}$, $a_{1C}$, and $a_{1L}$ may be determined using, for example, an LMS algorithm based on the value of symbol $S_1$. For example, $a_{1H}$ may be updated when $S_1 = +A$; $a_{1C}$ may be updated when $$S_1 = +A \cdot \left(\frac{1}{3} + \alpha\right);$$

and $a_{1L}$ may be updated when $$S_1 = -A \cdot \left(\frac{1}{3} \cdot \beta\right).$$

DFE 500 may perfectly cancel or significantly reduce post-cursor ISI for every possible value of $S_1$ in a communication system with RLM lower than 100%, such as the one shown in FIG. 4b, where the possible values of $S_1$ is given by Equation 4.

DFE 500 illustrates a 1-tap DFE according to an embodiment of the present invention. Some embodiments may implement a multi-tap DFE by including a shift register with one or more taps. A person skilled in the art would be able to modify DFE 500 to extend its implementation to a multi-tap DFE following the teachings disclosed herein.

Figure 5B:
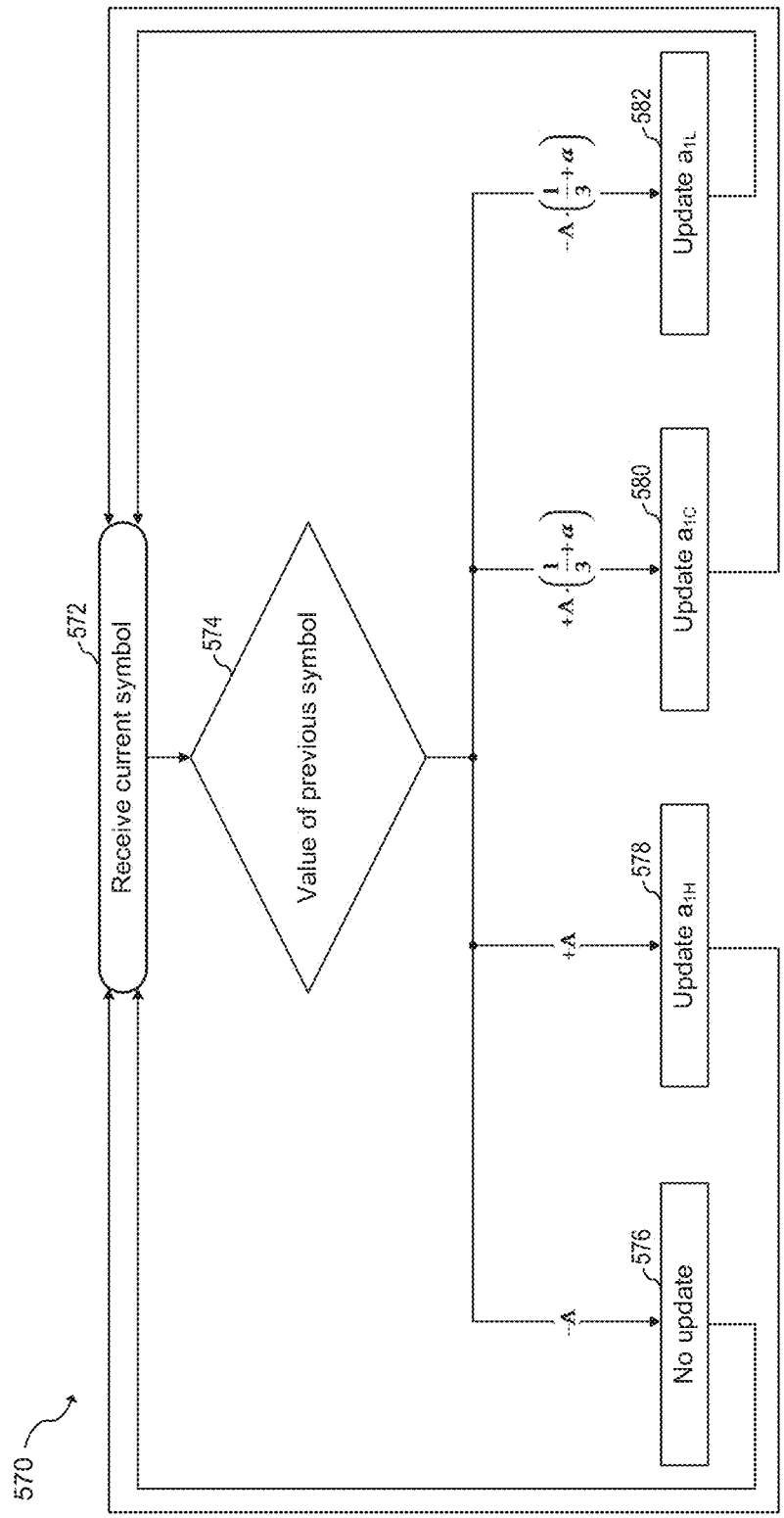
FIG. 5b shows a flow chart of an embodiment method of generating correction coefficients of a DFE, according to an embodiment of the present invention.

FIG. 5b shows a flow chart of embodiment method 570 of generating correction coefficients of DFE 500, according to an embodiment of the present invention. Method 570 may be implemented with DFE 500. Alternatively, method 570 may be implemented in other DFE implementations. The discussion that follows assumes that DFE 500, as shown in FIG. 5a, implements method 570.

During step 572, the current symbol, such as symbol $S_0$, is received. The updating of the correction coefficients is based on the value of the previous symbol, such as $S_1$, which is determined during step 574. When the previous symbol has a value that corresponds with the highest voltage, such as +A, the correction coefficient associated with the highest data bit, such as $H_1$, is updated, as shown in step 578. When the previous symbol has a value that corresponds with the second highest voltage, such as $$+A \cdot \left(\frac{1}{3} + \alpha\right),$$

the correction coefficient associated with the center data bit, such as $C_1$, is updated, as shown in step 580. When the previous symbol has a value that corresponds with the third highest voltage, such as $$-A \cdot \left(\frac{1}{3} + \alpha\right)$$

or $$-A \cdot \left(\frac{1}{3} + \beta\right),$$

the correction coefficient associated with the lowest data bit, such as $L_1$, is updated, as shown in step 582. When the previous symbol has a value that corresponds with the lowest voltage, such as −A, none of the correction coefficients are updated, as shown in step 576. After updating the correction coefficients, the next symbol is received, repeating the sequence. In some embodiments, when coefficients are updated, the updated coefficient is applied to the next symbol rather than to the current symbol.

The value of the correction coefficients may be determined using LMS algorithms. In some embodiments, the gain for the coefficient update may be low. In some embodiments, therefore, a large number of samples, such as 100 samples, may be processed before an improvement in performance is observed.

Figure 5C:
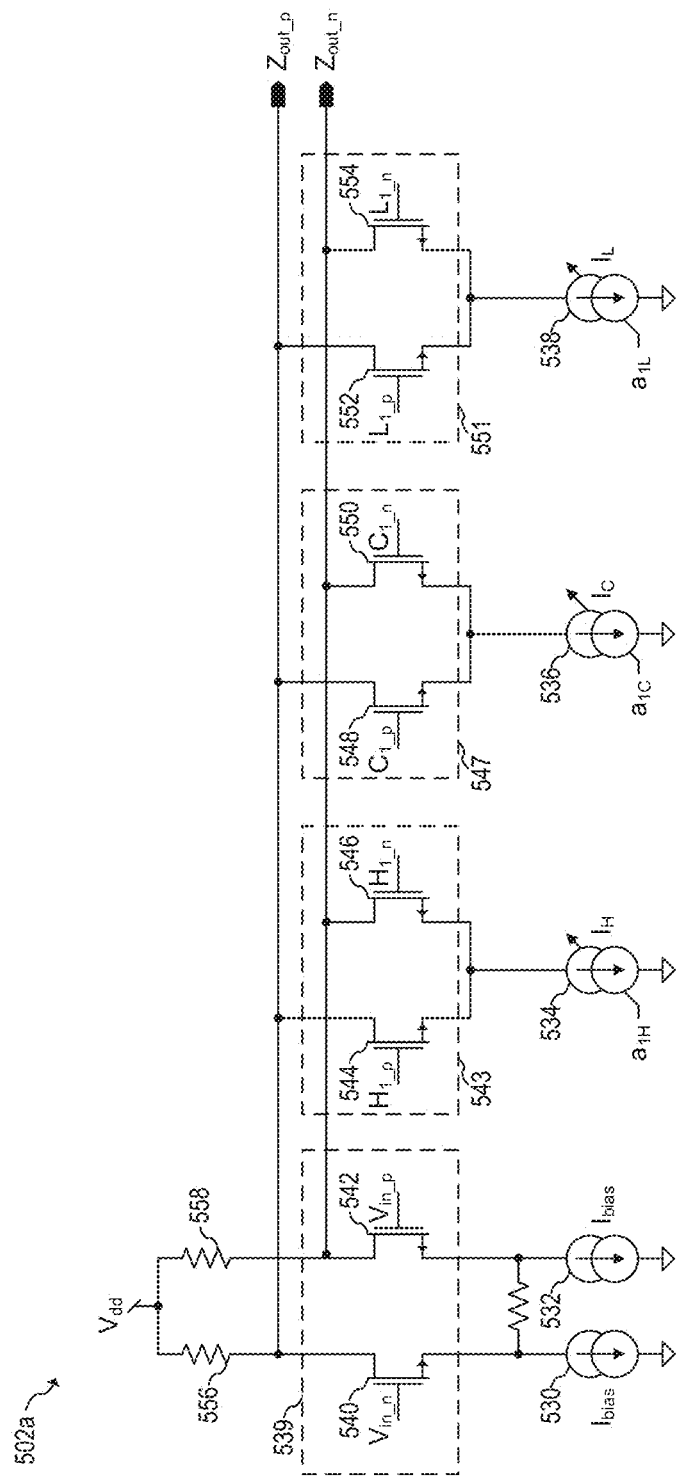
FIGS. 5c and 5d show two possible implementations of an adder, according to an embodiment of the present invention.
Figure 5D:
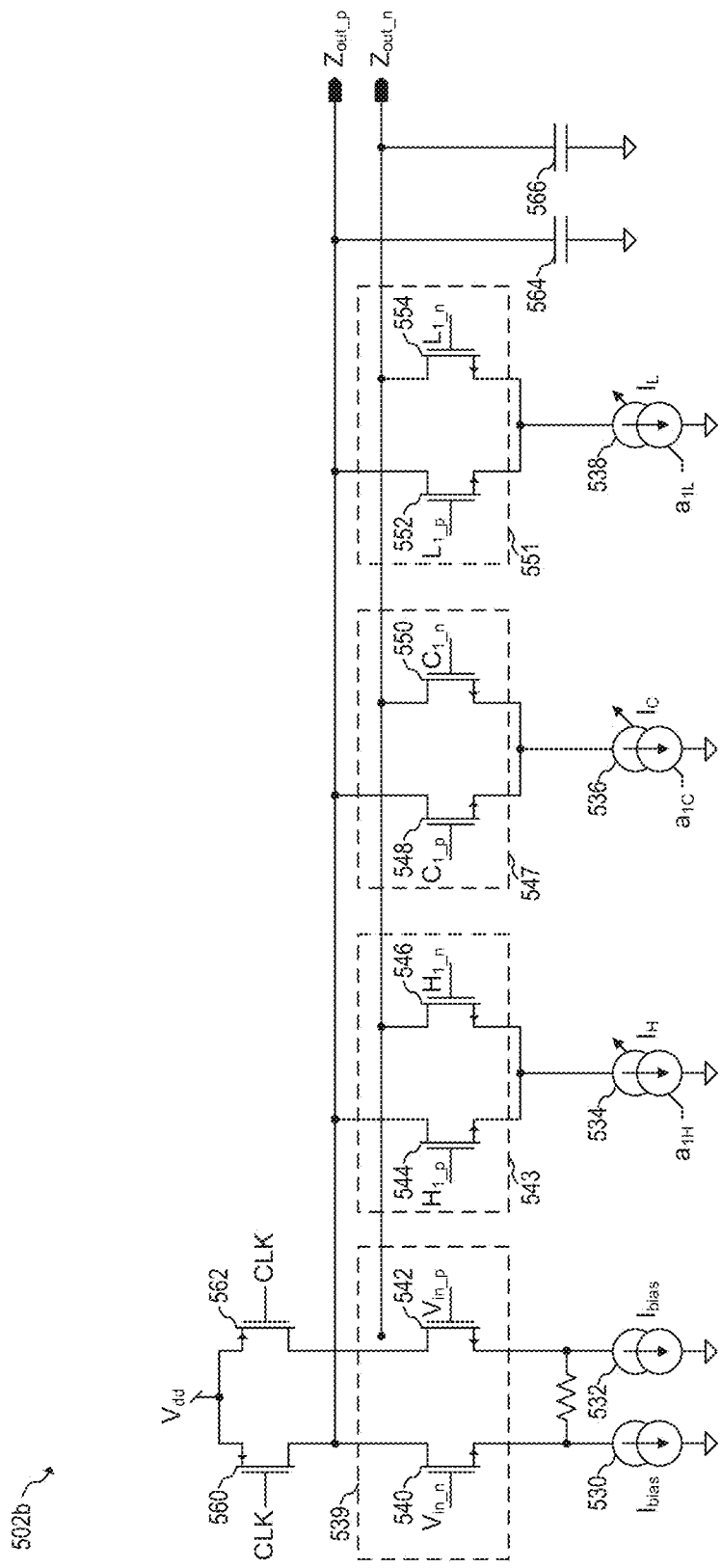

FIGS. 5c and 5d show two possible implementations of adder 502, according to an embodiment of the present invention. FIG. 5c shows adder 502a, according to an embodiment of the present invention. Adder 502a is a resistively loaded adder that includes load resistors 554 and 558, differential pairs 539, 543, 547, and 551, and current sources 530, 532, 534, 536, and 538. Differential pair 539 includes transistors 540, and 542. Differential pair 543 includes transistors 544, and 546. Differential pair 547 includes transistors 548, and 550. Differential pair 551 includes transistors 552, and 554.

During normal operation differential pair 539 receives differential input signals $V_{in\_p}$ and $V_{in\_n}$, which is represented as single-ended signal $V_{in}$ in FIG. 5a. Differential pair 539 is biased by current sources 530 and 532. Differential pair 539 may convert differential input signals $V_{in\_p}$ and $V_{in\_n}$ into current. Differential pairs 543, 547, and 551 are used as current switches driven by signals $H_1$, $C_1$, and $L_1$, which are represented as differential signals, $H_{1\_p}$ and $H_{1\_n}$, $C_{1\_p}$ and $C_{1\_n}$, and $L_{1\_p}$ and $L_{1\_n}$, respectively. In some embodiments, signals $H_{1\_p}$, $H_{1\_n}$, $C_{1\_p}$, $C_{1\_n}$, $L_{1\_p}$, and $L_{1\_n}$ are digital signals generated by slicers 504, 506 and 508, respectively. In such embodiments, for example, the values of signals $H_{1\_p}$, $H_{1\_n}$, $C_{1\_p}$, $C_{1\_n}$, $L_{1\_p}$, and $L_{1\_n}$ may be zero or $V_{dd}$, where $V_{dd}$ is the supply voltage.

Tail currents $I_H$, $I_C$, and $I_L$ are adjusted based on correction coefficients $a_{1H}$, $a_{1C}$ and $a_{1L}$, respectively, to form differential output voltages $Z_{out\_p}$ and $Z_{out\_n}$. A current digital-to-analog converter (I-DAC) may be used to generate tail currents $I_H$, $I_C$, and $I_L$.

FIG. 5d shows adder 502b, according to an embodiment of the present invention. Adder 502b is a current integrating adder that includes reset switches 560 and 562, differential pairs 539, 543, 547, and 551, current sources 530, 532, 534, 536, and 538, and integrating capacitors 564 and 566. During normal operation, the voltage of capacitors 564 and 566 are reset at the beginning of the integration period to have voltage $V_{dd}$. During the integration period, the summed currents discharge capacitors 564 and 566, forming differential output voltages $Z_{out\_p}$ and $Z_{out\_n}$.

Adders 502a and 502b are shown operating with differential signals. It is understood that adders 502a and 502b may be implemented and configured to operate with single ended signals.

Transistors 540, 542, 544, 546, 548, 550, 552, and 554 may be implemented as n-type complementary metal-oxide-semiconductor (CMOS) transistors while transistors 560, and 562 may be implemented as p-type CMOS transistors. It is understood that other types of transistors may be used. For example, a person skilled in the art may implement adders 502a or 502b using technologies alternative to CMOS, such as, for example, bipolar complementary metal-oxide-semiconductor (BiCMOS) technology. The particular type of transistors may also be altered with other appropriate modifications to the circuit.

Advantages of some embodiments include the ability of the receiver to compensate for non-linearities and distortion that affect post-cursor ISI in the communication system. Such compensation is capable of canceling or significantly reducing the effect of post-cursor ISI, thereby reducing the bit error rate of the communication system. Such improvement in the bit error rate is particularly advantageous as the peak-to-peak voltage of the transmitted and received signals is reduced, as well as with the scaling of the supply voltage, such as in newer technologies. The improvement in the bit error rate may be achieved without modifying the transmitter or the communication channel. Advantageously, some embodiments may continuously and properly recover symbols even in cases when the RLM is below 95%.

Other advantages of some embodiments include applicability to communication systems having symmetrical as well as non-symmetrical eye diagrams. Embodiments may also be adapted to other multi-level modulations, such as PAM-8, PAM-16, and others.

Figure 6A:
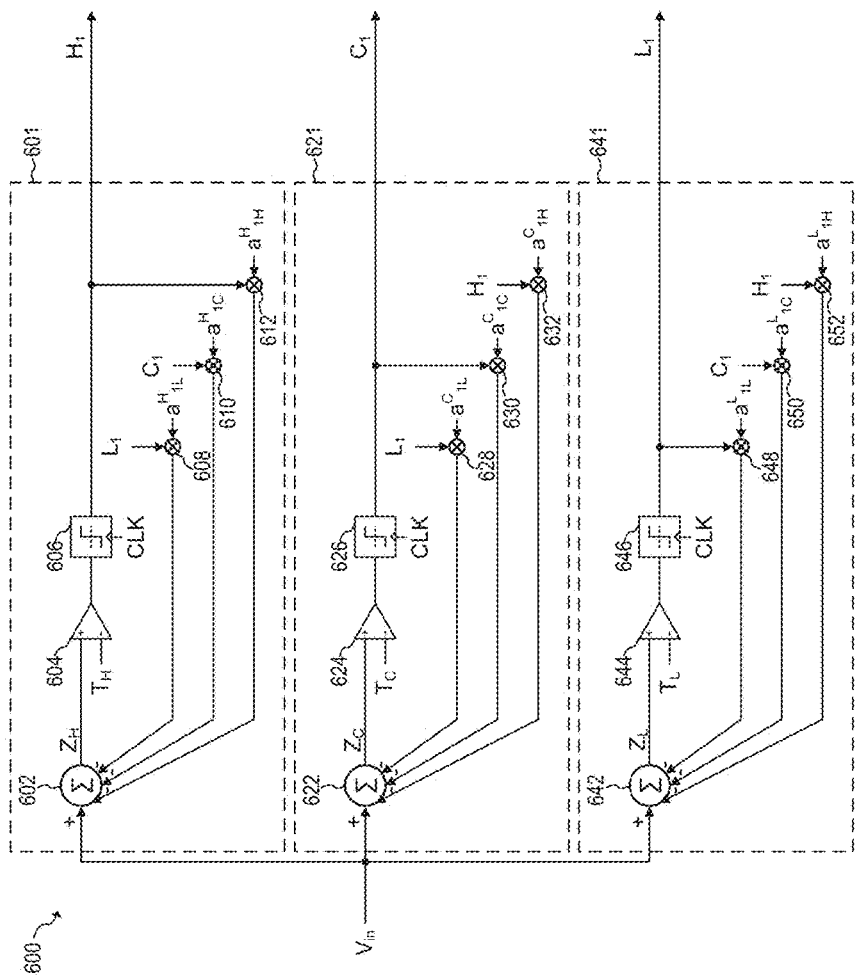
FIG. 6*a* shows a DFE, according to another embodiment of the present invention.

Some embodiments may also correct for distortion and non-linearities of the comparators of the DFE. For example, FIG. 6a shows DFE 600, according to an embodiment of the present invention. DFE 600 includes slicer and adder circuits 601, 621 and 631. Slicer and adder circuit 601 includes adder 602, comparator 604, slicer 606, and multipliers 608, 610, 612. Slicer and adder circuit 621 includes adder 622, comparator 624, slicer 626, and multipliers 628, 630, 632. Slicer and adder circuit 641 includes adder 642, comparator 644, slicer 646, and multipliers 648, 650, 652.

Similarly than DFE 500, DFE 600 may correct post-cursor ISI associated with non-linearities and distortion of the communication system. DFE 600 may also correct for distortion and non-linearities associated with DFE 600 itself. For example, DFE 600 may correct for distortion associated with comparators 604, 624, and 644.

As shown in FIG. 6a, DFE 600 includes a dedicated adder (adders 602, 622, and 644) to drive each dedicated slicer (slicers 606, 626, and 646). During normal operation, each dedicated adder receives analog input $V_{in}$ as well as the result of multiplying each of the thermometer encoded bits ($H_1$, $C_1$, and $L_1$) times independent correction coefficients and produces respective corrected analog signals $Z_H$, $Z_C$, and $Z_L$. Each of the corrected analog signals are compared using respective comparators 604, 624 and 644 with respective thresholds $T_H$, $T_C$, and $T_L$, and sliced using respective slicers 606, 626, and 646 to produce thermometer encoded bits $H_1$, $C_1$, and $L_1$, respectively.

DFE 600 may correct for distortion of comparators 604, 624 and 644, in part, because each correction coefficient can be varied independently. For example, assuming for the sake of simplicity that the channel pulse response coefficients are all equal to 0 except for $C_0$ and $C_1$, the input amplitude can vary from $-A$ to $+A$, the current symbol is $S_0$, and the previous symbol is $S_1$, correction coefficients may be found according to the following system of equations:

$$\begin{cases} C_1 = a_{1H}^H + a_{1C}^H + a_{1L}^H \\ C_1 \cdot \left(\frac{1}{3} + \alpha^H\right) = -a_{1H}^H + a_{1C}^H + a_{1L}^H \\ -C_1 \cdot \left(\frac{1}{3} + \alpha^H\right) = -a_{1H}^H - a_{1C}^H + a_{1L}^H \\ C_1 = a_{1H}^C + a_{1C}^C + a_{1L}^C \\ C_1 \cdot \left(\frac{1}{3} + \alpha^C\right) = -a_{1H}^C + a_{1C}^C + a_{1L}^C \\ -C_1 \cdot \left(\frac{1}{3} + \alpha^C\right) = -a_{1H}^C - a_{1C}^C + a_{1L}^C \\ C_1 = a_{1H}^L + a_{1C}^L + a_{1L}^L \\ C_1 \cdot \left(\frac{1}{3} + \alpha^L\right) = -a_{1H}^L + a_{1C}^L + a_{1L}^L \\ -C_1 \cdot \left(\frac{1}{3} + \alpha^L\right) = -a_{1H}^L - a_{1C}^L + a_{1L}^L \end{cases} \quad (7)$$

where the possible values of $S_1$ is given by Equation 4.

The correction coefficients $a^H{}_{1H}$, $a^H{}_{1C}$, $a^H{}_{1L}$, $a^C{}_{1H}$, $a^C{}_{1C}$, $a^C{}_{1L}$, $a^L{}_{1H}$, $a^L{}_{1C}$, and $a^L{}_{1L}$, may be determined using, for example, an LMS algorithm based on the value of symbol $S_0$ and $S_1$. For example, $a^H{}_{1H}$ may be updated when $S_0 = +A$ and $S_1 = +A$; $a^H{}_{1C}$ may be updated when $S_0 = +A$ and $$S_1 = +A \cdot \left(\frac{1}{3} + \alpha\right);$$

$a^H{}_{1L}$ may be updated when $S_0 = +A$ and $$S_1 = -A \cdot \left(\frac{1}{3} + \alpha\right);$$

$a^C{}_{1H}$ may be updated when $$S_0 = +A \cdot \left(\frac{1}{3} \cdot \alpha\right)$$

and $S_1 = +A$; $a^C{}_{1C}$ maybe updated when $$S_0 = +A \cdot \left(\frac{1}{3} + \alpha\right)$$

and $$S_1 = +A \cdot \left(\frac{1}{3} + \alpha\right);$$

$a^C{}_{1L}$ may be updated when $$S_0 = +A \cdot \left(\frac{1}{3} + \alpha\right)$$

and $$S_1 = -A \cdot \left(\frac{1}{3} + \alpha\right);$$

$a^L{}_{1H}$ may be updated when $$S_0 = -A \cdot \left(\frac{1}{3} + \alpha\right)$$

and $S_1 = +A$; $a^L{}_{1C}$ may be updated when $$S_0 = -A \cdot \left(\frac{1}{3} + \alpha\right)$$

and $$S_1 = +A \cdot \left(\frac{1}{3} + \alpha\right);$$

and $a^L{}_{1L}$ maybe updated when $$S_0 = -A \cdot \left(\frac{1}{3} + \alpha\right)$$

and $$S_1 = -A \cdot \left(\frac{1}{3} + \alpha\right).$$

It is understood that DFE 600 may be extended to operate with non-symmetrical eye diagrams. In such a case, Equation 7 may become $$\begin{cases} C_1 = a_{1H}^H + a_{1C}^H + a_{1L}^H \\ C_1 \cdot \left(\frac{1}{3} + \alpha^H\right) = -a_{1H}^H + a_{1C}^H + a_{1L}^H \\ -C_1 \cdot \left(\frac{1}{3} + \beta^H\right) = -a_{1H}^H - a_{1C}^H + a_{1L}^H \\ C_1 = a_{1H}^C + a_{1C}^C + a_{1L}^C \\ C_1 \cdot \left(\frac{1}{3} + \alpha^C\right) = -a_{1H}^C + a_{1C}^C + a_{1L}^C \\ -C_1 \cdot \left(\frac{1}{3} + \beta^C\right) = -a_{1H}^C - a_{1C}^C + a_{1L}^C \\ C_1 = a_{1H}^L + a_{1C}^L + a_{1L}^L \\ C_1 \cdot \left(\frac{1}{3} + \alpha^L\right) = -a_{1H}^L + a_{1C}^L + a_{1L}^L \\ -C_1 \cdot \left(\frac{1}{3} + \beta^L\right) = -a_{1H}^L - a_{1C}^L + a_{1L}^L \end{cases} \quad (8)$$

Figure 6B:
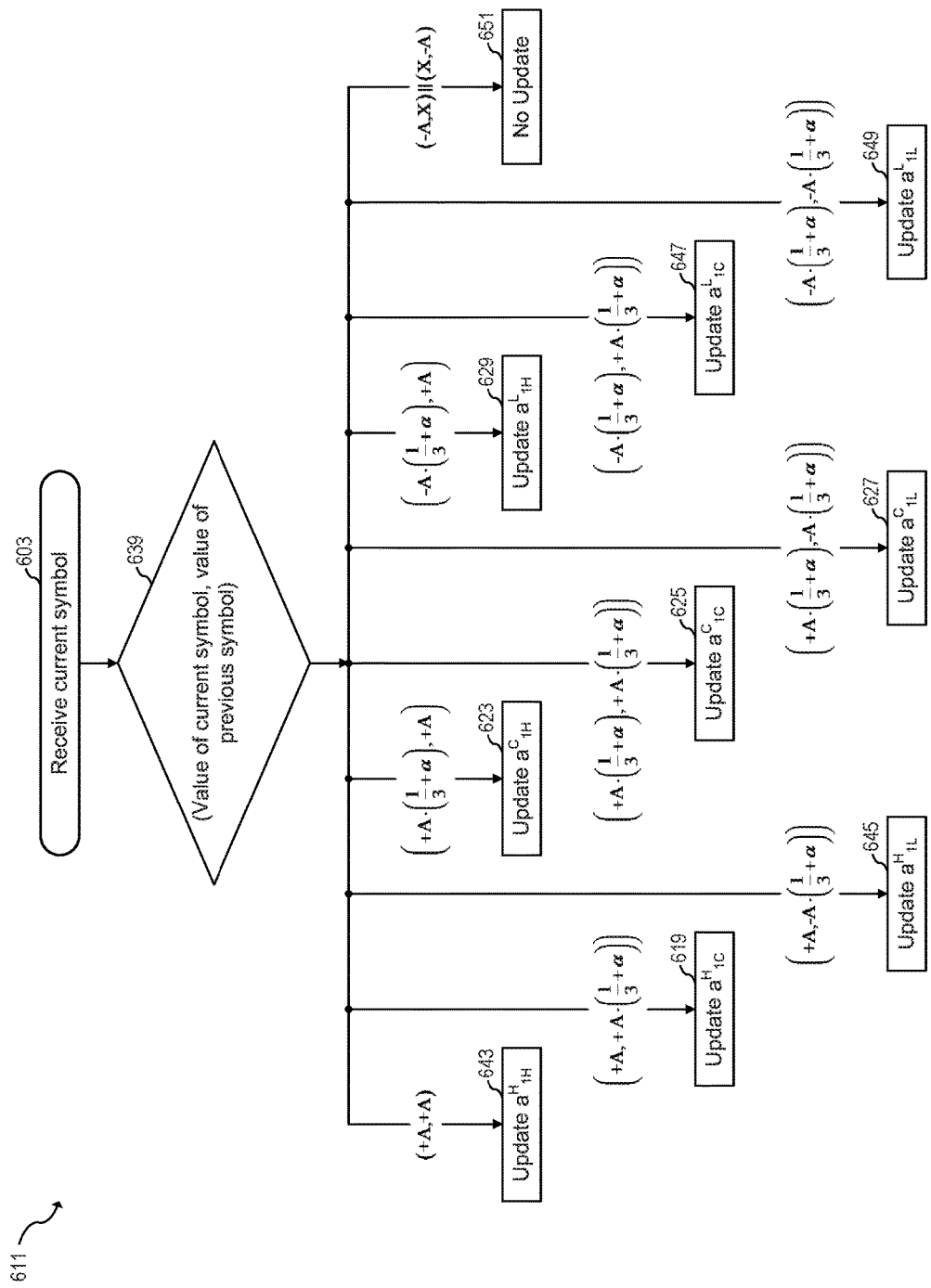
FIG. 6*b* shows a flow chart of an embodiment method of generating correction coefficients of a DFE, according to another embodiment of the present invention.

FIG. 6b shows a flow chart of embodiment method 611 of generating correction coefficients of DFE 600, according to an embodiment of the present invention. Method 611 may be implemented with DFE 600. Alternatively, method 611 may be implemented in other DFE implementations. The discussion that follows assumes that DFE 611, as shown in FIG. 6a, implements method 611.

During step 603, the current symbol, such as symbol $S_0$, is received. The updating of the correction coefficients is based on the value of the previous symbol, such as $S_1$, as well as the current symbol, which are determined during step 639. When the previous symbol has a value that corresponds with the highest voltage, such as $+A$, and the current symbol has a value that corresponds with the highest voltage, the correction coefficient associated with the highest data bit, such as $H_1$, as applied to the adder associated with the highest data bit, such as adder 602, is updated, as shown in step 643. When the previous symbol has a value that corresponds with the second highest voltage, such as $$+A \cdot \left(\frac{1}{3} + \alpha\right),$$

and the current symbol has a value that corresponds with the highest voltage, the correction coefficient associated with the center data bit, such as $C_1$, as applied to the adder associated with the highest data bit is updated, as shown in step 619. When the previous symbol has a value that corresponds with the third highest voltage, such as $$-A \cdot \left(\frac{1}{3} + \alpha\right)$$

or $$-A \cdot \left(\frac{1}{3} + \beta\right),$$

and the current symbol has a value that corresponds with the highest voltage, the correction coefficient associated with the lowest data bit, such as $L_1$, as applied to the adder associated with the highest data bit is updated, as shown in step 645. When the previous symbol has a value that corresponds with the highest voltage and the current symbol has a value that corresponds with the second highest voltage, the correction coefficient associated with the highest data bit as applied to the adder associated with the center data bit, such as adder 622, is updated, as shown in step 623. When the previous symbol has a value that corresponds with the second highest voltage, and the current symbol has a value that corresponds with the second highest voltage, the correction coefficient associated with the center data bit, as applied to the adder associated with the center data bit is updated, as shown in step 625. When the previous symbol has a value that corresponds with the third highest voltage, and the current symbol has a value that corresponds with the second highest voltage, the correction coefficient associated with the lowest data bit, as applied to the adder associated with the center data bit is updated, as shown in step 627. When the previous symbol has a value that corresponds with the highest voltage and the current symbol has a value that corresponds with the third highest voltage, the correction coefficient associated with the highest data bit as applied to the adder associated with the lower data bit, such as adder 642, is updated, as shown in step 629. When the previous symbol has a value that corresponds with the second highest voltage, and the current symbol has a value that corresponds with the third highest voltage, the correction coefficient associated with the center data bit, as applied to the adder associated with the lower data bit is updated, as shown in step 647. When the previous symbol has a value that corresponds with the third highest voltage, and the current symbol has a value that corresponds with the third highest voltage, the correction coefficient associated with the lowest data bit, as applied to the adder associated with the lower data bit is updated, as shown in step 649. When the previous symbol has a value that corresponds with the lowest voltage, such as $-A$, or the current symbol has a value associated with the lowest voltage, none of the correction coefficients are updated, as shown in step 651. After updating the correction coefficients, the next symbol is received, repeating the sequence.

Some embodiments may determine the value of the correction coefficients based on pattern filtering. For example, a dedicated accumulator may be used to accumulate the error of each of the correction coefficients. The error accumulation for a given accumulator is activated only when the previous symbol and the current symbol are detected, as described in FIG. 6b.

Figure 6C:
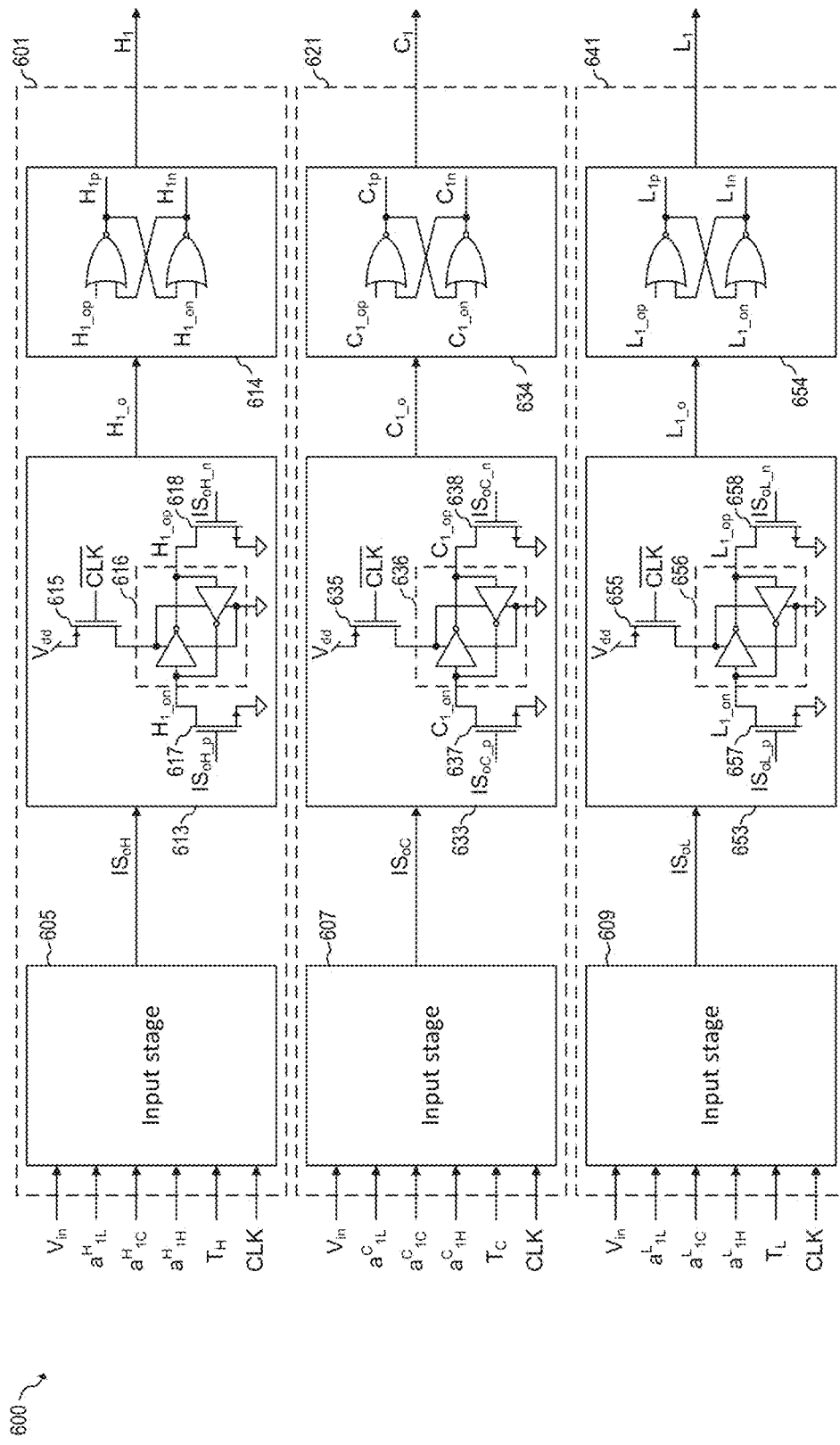
FIG. 6*c* shows a schematic diagram of a possible implementation of the DFE of FIG. 6*a*, according to an embodiment of the present invention.

FIG. 6c shows a schematic diagram of DFE 600 with a possible implementation of slicer and adder circuits 601, 621, and 641, according to an embodiment of the present invention. Slicer and adder circuit 601 includes input stage 605, regeneration latch 613 and SR latch 614. Slicer and adder circuit 621 includes input stage 607, regeneration latch 633 and SR latch 634. Slicer and adder circuit 641 includes input stage 609, regeneration latch 653 and SR latch 654.

During normal operation, clock signal CLK and clock signal CLK have opposite phase. Each clock cycle, when clock signal CLK is high, input stages 605, 607, and 609 produce a stable signal in their respective output signals $IS_{oH}$, $IS_{oC}$, and $IS_{oL}$. In some embodiments, signals $IS_{oH}$, $IS_{oC}$, and $IS_{oL}$ are analog signals that have already been compensated for non-linearities and distortion since the compensation happens in the first state.

Regeneration latches 613, 633, and 653 receive signals $IS_{oH}$, $IS_{oC}$, and $IS_{oL}$ from input stages 605, 607, and 609, respectively. Regeneration latches 613, 633, and 653 include respective clocked pair of back-to-back inverters 616, 626, and 656, which regenerate the respective received signals to a full rail-to-rail swing. For example, since clock signal CLK is low when clock signal CLK is high, transistors 615, 635, and 655 are on and the data of the differential signals associated with $IS_{oH}$, $IS_{oC}$, and $IS_{oL}$ are latched into latches 616, 636, and 656, respectively, when clock signal CLK is high. When clock signal CLK is low, latches 616, 636 and 656 preserve their state. SR latches 614, 634, and 654 store the data received from regeneration latches 613, 633, and 653.

SR latches 614, 634, and 654 may be implemented with NOR gates. In some embodiments, SR latches 614, 634, and 654 may be implemented with NAND gates. Other implementations are also possible.

Transistors 617, 618, 637, 638, 657, and 658 may be implemented as n-type CMOS transistors while transistors 615, 635, and 655 may be implemented as p-type CMOS transistors. It is understood that other types of transistors may be used. For example, a person skilled in the art may implement DFE 600 using technologies alternative to CMOS, such as BiCMOS. The particular type of transistors may also be altered with other appropriate modifications to the circuit.

Figure 6D:
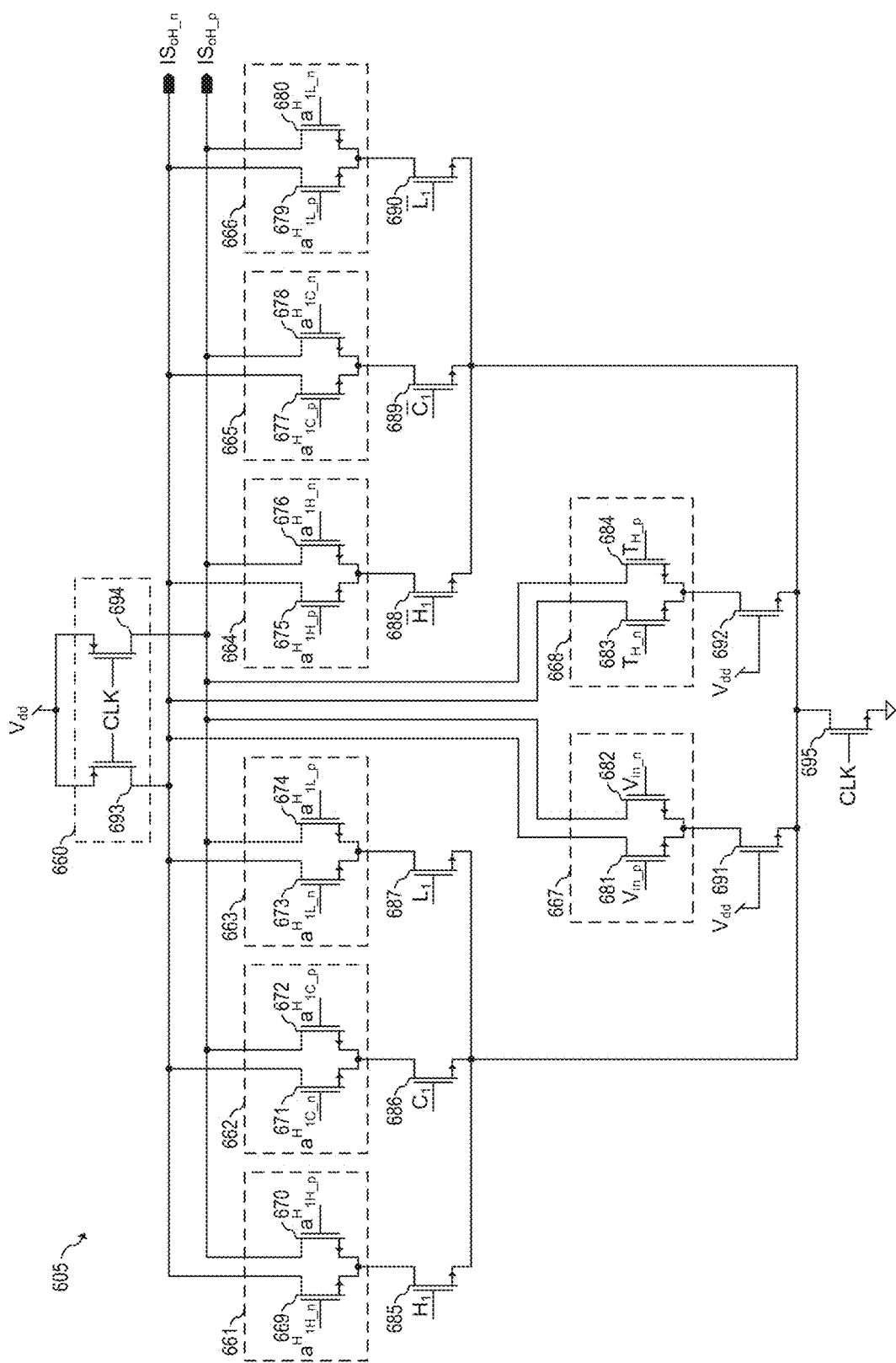
FIG. 6*d* shows an input stage of a DFE, according to an embodiment of the present invention.

FIG. 6d shows input stage 605 of DFE 600, according to an embodiment of the present invention. It is understood that input stages 607 and 609 may be implemented in a similar manner than input stage 605, as shown in FIG. 6d. Input stage 607 includes differential pairs 661, 662, 663, 664, 665, 666, 667, and 668, and transistors 685, 686, 687, 688, 689, 690, 691, 692, 693, 694, and 695. Differential pair 667 includes transistors 681 and 682 and is configured to receive a differential signal associated with analog input $V_{in}$. Differential pair 668 includes transistors 683 and 684 and is configured to receive a differential signal associated with threshold $T_H$. Differential pairs 661, 662, 663, 664, 665, and 666 includes transistors 669, 670, 671, 672, 673, 674, 675, 676, 677, 678, 679, and 680, respectively, and are configured to receive the differential signals associated with correction coefficients $a^H_{1H}$, $a^H_{1C}$, $a^H_{1L}$, respectively.

During normal operation, differential pairs 667 and 668 are always enabled, as shown by transistors 691 and 692 being always on as a result of having their respective gates tied to $V_{dd}$. When clock signal CLK is low, transistors 693 and 694 are on while transistor 695 is off. When clock signal CLK is low, therefore, the capacitances associated with output lines $H_{1\_p}$ and $H_{1\_n}$ are charged to $V_{dd}$.

When clock signal CLK is high, differential pairs 667 and 668 subtract current from output lines $IS_{oH\_p}$ and $IS_{oH\_n}$ according to the voltages on the respective inputs of differential pairs 667 and 668. Differential pairs 661, 662, 663, 664, 665, and 666 also subtract current from output lines $IS_{oH\_p}$ and $IS_{oH\_n}$ according to the voltages on the respective inputs of differential pairs 661, 662, 663, 664, 665, and 666 as well as based on the state of switches 685, 686, 687, 688, 689 and 690. Switches 685, 686, 687, 688, 689 and 690 may operate as an on/off switch based on the state of data bits $H_1$, $C_1$, $L_1$, $\overline{H_1}$, $\overline{C_1}$, and $\overline{L_1}$, where $\overline{H_1}$, $\overline{C_1}$, and $\overline{L_1}$, are respective inverted signals of $H_1$, $C_1$, and $L_1$. The current flowing through the differential pairs that are disabled by switches 685, 686, 687, 688, 689, and 690 would be at or near 0 pA, while the current flowing through the differential pairs that are enabled by switches 685, 686, 687, 688, 689, and 690 would be based on the respective values of correction coefficients $a^H_{1H}$, $a^H_{1C}$, $a^H_{1L}$. The associated voltage produced at output lines $IS_{oH\_p}$ and $IS_{oH\_n}$, therefore, are based on the correction coefficients $a^H_{1H}$, $a^H_{1C}$, $a^H_{1L}$, as well as on the value of threshold $T_H$ and on analog input $V_{in}$.

As shown in FIG. 6d, input stage 605 may perform the multiplication of correction coefficients $a^H_{1H}$, $a^H_{1C}$, $a^H_{1L}$ times the thermometer encoded bits ($H_1$, $C_1$, and $L_1$) by using differential pairs 661, 662, 663, 664, 665, and 666 and transistors 685, 686, 687, 688, 689, and 690, respectively. The comparison between analog input $V_{in}$ and threshold $T_H$ may be performed by differential pair 668. Other implementations are also possible.

DFE 600 illustrates a 1-tap DFE according to an embodiment of the present invention. Some embodiments may implement a multi-tap DFE that includes a shift register with one or more taps. A person skilled in the art would be able to modify DFE 600 to extend its implementation to a multi-tap DFE following the teachings disclosed herein.

Embodiments of the present invention, such as DFEs 500 and 600, may be implemented in an integrated circuit (IC). For example, an IC including a serializer/deserializer (SerDes) block may implement DFE 500 or DFE 600.

Some embodiments may be implemented in communication systems having data rates of 20 Gbps. Other data rates, such as 32 Gbps, 56 Gbps or higher are possible. Data rates lower than 20 Gbps are also possible.

Advantages of some embodiments include the compensation of non-linearities of and distortion associated with the communication system as well as compensation of non-linearities and distortion associated with analog circuitry of the DFE itself.

One general aspect includes a DFE including: an input terminal configured to receive an input signal carrying a plurality of symbols; an adder circuit coupled to the input terminal of the DFE; a plurality of comparator circuits configured to receive respective threshold signals; a plurality of slicer circuits coupled to respective comparator circuits of the plurality of comparator circuits; and a plurality of multiplier circuits coupled to respective slicer circuits of the plurality of slicer circuits, the plurality of multiplier circuits configured to multiply respective correction coefficients of a plurality of correction coefficients times respective outputs of respective slicer circuits to produce respective multiplication results of a plurality of multiplication results, where: the adder circuit is configured to subtract the plurality of multiplication results from the input signal, and the plurality of correction coefficients are independently adjusted based on a previously received symbol.

Implementations may include one or more of the following features. The DFE further including a plurality of shift register coupled to respective outputs of respective slicer circuits. The DFE where the respective correction coefficients are adjusted by adjusting a single correction coefficient of the plurality of correction coefficients without adjusting other correction coefficients of the plurality of correction coefficients when a new symbol is received at the input terminal of the DFE. The DFE where the adder circuit is a first adder circuit of a plurality of adder circuits, where each adder circuit of the plurality of adder circuits is coupled to respective comparator circuits of the plurality of comparator circuits. The DFE where each adder circuit of the plurality of adder circuits, respective comparator circuits of the plurality of comparator circuits, respective multiplier circuits, and respective slicer circuits of the plurality of slicer circuits form respective adder and slicer circuits. The DFE where the input signal includes a differential input signal. The DFE where the plurality of symbols includes a plurality of pulse-amplitude modulation with four levels (PAM-4) symbols. The DFE where: the plurality of comparator circuits includes a high comparator circuit coupled to the adder circuit, a center comparator circuit coupled to the adder circuit, and a low comparator circuit coupled to the adder circuit; the plurality of slicer circuits includes a high slicer circuit coupled to the high comparator circuit, a center slicer circuit coupled to the center comparator circuit, and a low slicer circuit coupled to the low comparator circuit, the high slicer circuit configured to produce a high data bit, the center slicer circuit configured to produce a center data bit, and the low slicer circuit configured to produce a low data bit; the plurality of correction coefficients includes a high correction coefficient, a center correction coefficient, and a low correction coefficient; and the plurality of multiplier circuits includes a high multiplier circuit configured to multiply the high data bit times the high correction coefficient, a center multiplier circuit configured to multiply the center data bit times the center correction coefficient, and a low multiplier circuit configured to multiply the low data bit times the low correction coefficient. The DFE where an immediately preceding symbol of the plurality of symbols has a first level, and where adjusting respective correction coefficients includes: when the first level corresponds to a highest voltage, updating the high correction coefficient; when the first level corresponds to a second highest voltage, updating the center correction coefficient; and when the first level corresponds to a third highest voltage, updating the low correction coefficient. The DFE where the highest voltage corresponds to a first positive voltage, the second highest voltage corresponds to the first positive voltage divided by three plus a first constant, and the third highest voltage corresponds to a negative voltage. The DFE where the first constant is determined using statistical analysis based on an eye diagram of the PAM-4 symbols. The DFE where respective correction coefficients are determined using an LMS algorithm. The DFE further including a plurality of output terminals coupled to respective slicer circuits, where the plurality of slicer circuits is configured to produce thermometer encoded data bits based on the input signal at respective output terminals of the DFE. The DFE where the adder circuit includes a resistively loaded adder circuit. The DFE where the adder circuit includes a current integrating adder circuit. The DFE where the adder circuit includes: a differential output terminal; a first plurality of differential pairs, each of the differential pairs of the first plurality of differential pairs coupled to the differential output terminal of the adder circuit; a plurality of variable current sources coupled to respective differential pairs of the first plurality of differential pairs, where each tail current flowing through respective variable current sources of the plurality of variable current sources are independently controlled by respective correction coefficients; and a second differential pair coupled to the differential output terminal of the adder circuit and coupled to the input terminal of the DFE. The DFE further including a plurality of current digital-to-analog converters (I-DACs) configured to generate respective tail currents flowing through respective variable current sources of the plurality of variable current sources.

Another general aspect includes a DFE including: an input terminal configured to receive an input signal carrying a plurality of symbols; a plurality of adder circuits coupled to the input terminal of the DFE; a plurality of comparator circuits coupled to respective adder circuits, the plurality of comparator circuits configured to receive respective threshold signals; a plurality of slicer circuits coupled to respective comparator circuits of the plurality of comparator circuits; a plurality of multiplier circuits coupled to respective slicer circuits of the plurality of slicer circuits, the plurality of multiplier circuits configured to multiply respective correction coefficients of a plurality of correction coefficients times respective outputs of respective slicer circuits to produce respective multiplication results; and a plurality of output terminals coupled to respective slicer circuits, where: respective adder circuits are configured to subtract from the input signal respective plurality of multiplication results, and respective correction coefficients are independently adjusted based on a previously received symbol.

Implementations may include one or more of the following features. The DFE where adjusting respective correction coefficients includes adjusting a single correction coefficient of the plurality of correction coefficients without adjusting other correction coefficients of the plurality of correction coefficients when a new symbol is received at the input terminal of the DFE. The DFE where the plurality of slicer circuits is configured to produce thermometer encoded data bits based on the input signal at respective output terminals of the DFE. The DFE where the input signal includes a differential input signal. The DFE where each adder circuit of the plurality of adder circuits, respective comparator circuits of the plurality of comparator circuits, respective multiplier circuits, and respective slicer circuits of the plurality of slicer circuits form respective adder and slicer circuits of a plurality of adder and slicer circuits. The DFE where each adder and slicer circuit of the plurality of adder and slicer circuits includes: an input stage circuit having a first output node, the input stage circuit configured to receive the input signal, a respective threshold signal, and respective correction coefficients, the input stage circuit configured to generate a first signal at the first output node; a regeneration latch circuit having a second output node, the regeneration latch circuit having an input coupled to the first output node; and an output latch circuit coupled to respective output terminal of the DFE, the output latch circuit having an input coupled to the second output node. The DFE where each input stage circuit includes: a first plurality of differential pairs coupled to the first output node, each differential pair of the first plurality of differential pairs configured to receive respective correction coefficients; a plurality of enable switches coupled in series with respective differential pairs of the first plurality of differential pairs, where each enable switch of the plurality of enable switches is controlled based on voltages of respective output terminals of the DFE; a second differential pair coupled to the first output node, the second differential pair configured to receive the input signal; and a third differential pair coupled to the first output node, the third differential pair configured to receive the respective threshold signal. The DFE where the plurality of symbols includes a plurality of pulse-amplitude modulation with four levels (pam-4) symbols. The DFE where: the plurality of adder circuits includes a high adder circuit, a center adder circuit, and a low adder circuit; the plurality of comparator circuits includes a high comparator circuit coupled to the high adder circuit, a center comparator circuit coupled to the center adder circuit, and a low comparator circuit coupled to the low adder circuit; the plurality of slicer circuits includes a high slicer circuit coupled to the high comparator circuit, a center slicer circuit coupled to the center comparator circuit, and a low slicer circuit coupled to the low comparator circuit, the high slicer circuit configured to produce a high data bit, the center slicer circuit configured to produce a center data bit, and the low slicer circuit configured to produce a low data bit; the plurality of correction coefficients includes a high-high correction coefficient, a high-center correction coefficient, a high-low correction coefficient, a center-high correction coefficient, a center-center correction coefficient, a center-low correction coefficient, a low-high correction coefficient, a low-center correction coefficient, and a low-low correction coefficient; and the plurality of multiplier circuits includes a high-high multiplier circuit configured to multiply the high data bit times the high-high correction coefficient, a high-center multiplier circuit configured to multiply the center data bit times the high-center correction coefficient, a high-low multiplier circuit configured to multiply the low data bit times the high-low correction coefficient, a center-high multiplier circuit configured to multiply the high data bit times the center-high correction coefficient, a center-center multiplier circuit configured to multiply the center data bit times the center-center correction coefficient, a center-low multiplier circuit configured to multiply the low data bit times the center-low correction coefficient, a low-high multiplier circuit configured to multiply the high data bit times the low-high correction coefficient, a low-center multiplier circuit configured to multiply the center data bit times the low-center correction coefficient, and a low-low multiplier circuit configured to multiply the low data bit times the low-low correction coefficient. The DFE where a current symbol of the plurality of symbols has a second level and an immediately preceding symbol of the plurality of symbols has a first level, and where adjusting respective correction coefficients includes: when the first level corresponds to a highest voltage and the second level corresponds to the highest voltage, updating the high-high correction coefficient; when the first level corresponds to a second highest voltage and the second level corresponds to the highest voltage, updating the high-center correction coefficient; when the first level corresponds to a third highest voltage and the second level corresponds to the highest voltage, updating the high-low correction coefficient; when the first level corresponds to the highest voltage and the second level corresponds to the second highest voltage, updating the center-high correction coefficient; when the first level corresponds to the second highest voltage and the second level corresponds to the second highest voltage, updating the center-center correction coefficient; when the first level corresponds to the third highest voltage and the second level corresponds to the second highest voltage, updating the center-low correction coefficient; when the first level corresponds to the highest voltage and the second level corresponds to the third highest voltage, updating the low-high correction coefficient; when the first level corresponds to the second highest voltage and the second level corresponds to the third highest voltage, updating the low-center correction coefficient; and when the first level corresponds to the third highest voltage and the second level corresponds to the third highest voltage, updating the low-low correction coefficient. The DFE where the highest voltage corresponds to a first positive voltage, the second highest voltage corresponds to the first positive voltage divided by three plus a first constant, and the third highest voltage corresponds to a negative voltage. The DFE where the first constant is non-zero. The DFE where the plurality of correction coefficients are determined using an LMS algorithm.

Yet another general aspect includes a method of operating a DFE in a communication system, the method including: receiving an input signal carrying a plurality of symbols at an input terminal; generating a corrected signal with an adder circuit coupled to the input terminal; comparing the corrected signal with a plurality of thresholds by using a plurality of comparator circuits coupled to the adder circuit; and generating thermometer encoded data bits with a plurality of slicer circuits coupled to respective comparator circuits based on the corrected signal, where generating the corrected signal includes: multiplying each data bit of the thermometer encoded data bits times respective correction coefficients of a plurality of correction coefficients to produce a multiplication result, and subtracting, by the adder circuit, the multiplication result from the input signal, where the plurality of correction coefficients are independently adjusted based on a previously received symbol.

Implementations may include one or more of the following features. The method where adjusting the correction coefficients includes adjusting a single correction coefficient of the plurality of correction coefficients without adjusting other correction coefficients of the plurality of correction coefficients when a new symbol is received at the input terminal of the DFE. The method where the communication system transmit data using 4-level pulse amplitude modulation (pam-4). The method adjusting the correction coefficients includes: when a first level of an immediately preceding symbol of the plurality of symbols corresponds to a highest voltage, updating a high correction coefficient of the plurality of correction coefficients; when the first level of the immediately preceding symbol of the plurality of symbols corresponds to a second highest voltage, updating a center correction coefficient of the plurality of correction coefficients; and when the first level of the immediately preceding symbol of the plurality of symbols corresponds to a third highest voltage, updating a low correction coefficient of the plurality of correction coefficients. The method where the highest voltage corresponds to a first positive voltage, the second highest voltage corresponds to the first voltage divided by three plus a first constant, and the third highest voltage corresponds to a negative voltage. The method where the communication system transmits data at data rates between 20 Gbps and 56 Gbps. The method where the communication system includes a wireline communication system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A decision feedback equalizer (DFE) comprising:
an input terminal configured to receive an input signal carrying a plurality of symbols;
an adder circuit coupled to the input terminal of the DFE;
a plurality of comparator circuits configured to receive respective threshold signals;
a plurality of slicer circuits coupled to respective comparator circuits of the plurality of comparator circuits; and
a plurality of multiplier circuits coupled to respective slicer circuits of the plurality of slicer circuits, the plurality of multiplier circuits configured to multiply respective correction coefficients of a plurality of correction coefficients times respective outputs of respective slicer circuits to produce respective multiplication results of a plurality of multiplication results, wherein:
the adder circuit is configured to subtract the plurality of multiplication results from the input signal, and
the plurality of correction coefficients are independently adjusted based on a previously received symbol.

2. The DFE of claim 1, further comprising a plurality of shift register taps coupled to respective outputs of respective slicer circuits.

3. The DFE of claim 1, wherein the respective correction coefficients are adjusted by adjusting a single correction coefficient of the plurality of correction coefficients without adjusting other correction coefficients of the plurality of correction coefficients when a new symbol is received at the input terminal of the DFE.

4. The DFE of claim 1, wherein the adder circuit is a first adder circuit of a plurality of adder circuits, wherein each adder circuit of the plurality of adder circuits is coupled to respective comparator circuits of the plurality of comparator circuits.

5. The DFE of claim 4, wherein each adder circuit of the plurality of adder circuits, respective comparator circuits of the plurality of comparator circuits, respective multiplier circuits, and respective slicer circuits of the plurality of slicer circuits form respective adder and slicer circuits.

6. The DFE of claim 1, wherein the input signal comprises a differential input signal.

7. The DFE of claim 1, wherein the plurality of symbols comprises a plurality of pulse-amplitude modulation with four levels (PAM-4) symbols.

8. The DFE of claim 7, wherein:
the plurality of comparator circuits comprises a high comparator circuit coupled to the adder circuit, a center comparator circuit coupled to the adder circuit, and a low comparator circuit coupled to the adder circuit;

the plurality of slicer circuits comprises a high slicer circuit coupled to the high comparator circuit, a center slicer circuit coupled to the center comparator circuit, and a low slicer circuit coupled to the low comparator circuit, the high slicer circuit configured to produce a high data bit, the center slicer circuit configured to produce a center data bit, and the low slicer circuit configured to produce a low data bit;

the plurality of correction coefficients comprises a high correction coefficient, a center correction coefficient, and a low correction coefficient; and the plurality of multiplier circuits comprises a high multiplier circuit configured to multiply the high data bit times the high correction coefficient, a center multiplier circuit configured to multiply the center data bit times the center correction coefficient, and a low multiplier circuit configured to multiply the low data bit times the low correction coefficient.

9. The DFE of claim 8, wherein an immediately preceding symbol of the plurality of symbols has a first level, and wherein adjusting respective correction coefficients comprises:

when the first level corresponds to a highest voltage, updating the high correction coefficient;

when the first level corresponds to a second highest voltage, updating the center correction coefficient; and when the first level corresponds to a third highest voltage, updating the low correction coefficient.

10. The DFE of claim 9, wherein the highest voltage corresponds to a first positive voltage, the second highest voltage corresponds to the first positive voltage divided by three plus a first constant, and the third highest voltage corresponds to a negative voltage.

11. The DFE of claim 10, wherein the first constant is determined using statistical analysis based on an eye diagram of the PAM-4 symbols.

12. The DFE of claim 1, wherein respective correction coefficients are determined using a least-mean-square (LMS) algorithm.

13. The DFE of claim 1, further comprising a plurality of output terminals coupled to respective slicer circuits, wherein the plurality of slicer circuits is configured to produce thermometer encoded data bits based on the input signal at respective output terminals of the DFE.

14. The DFE of claim 1, wherein the adder circuit comprises a resistively loaded adder circuit.

15. The DFE of claim 1, wherein the adder circuit comprises a current integrating adder circuit.

16. The DFE of claim 1, wherein the adder circuit comprises:

a differential output terminal;

a first plurality of differential pairs, each of the differential pairs of the first plurality of differential pairs coupled to the differential output terminal of the adder circuit;

a plurality of variable current sources coupled to respective differential pairs of the first plurality of differential pairs, wherein each tail current flowing through respective variable current sources of the plurality of variable current sources are independently controlled by respective correction coefficients; and a second differential pair coupled to the differential output terminal of the adder circuit and coupled to the input terminal of the DFE.

17. The DFE of claim 16, further comprising a plurality of current digital-to-analog converters (I-DACs) configured to generate respective tail currents flowing through respective variable current sources of the plurality of variable current sources.

18. A decision feedback equalizer (DFE) comprising:

an input terminal configured to receive an input signal carrying a plurality of symbols;

a plurality of adder circuits coupled to the input terminal of the DFE;

a plurality of comparator circuits coupled to respective adder circuits, the plurality of comparator circuits configured to receive respective threshold signals;

a plurality of slicer circuits coupled to respective comparator circuits of the plurality of comparator circuits;

a plurality of multiplier circuits coupled to respective slicer circuits of the plurality of slicer circuits, the plurality of multiplier circuits configured to multiply respective correction coefficients of a plurality of correction coefficients times respective outputs of respective slicer circuits to produce respective multiplication results; and a plurality of output terminals coupled to respective slicer circuits, wherein:

respective adder circuits are configured to subtract from the input signal respective plurality of multiplication results, and respective correction coefficients are independently adjusted based on a previously received symbol.

19. The DFE of claim 18, wherein adjusting respective correction coefficients comprises adjusting a single correction coefficient of the plurality of correction coefficients without adjusting other correction coefficients of the plurality of correction coefficients when a new symbol is received at the input terminal of the DFE.

20. The DFE of claim 18, wherein the plurality of slicer circuits is configured to produce thermometer encoded data bits based on the input signal at respective output terminals of the DFE.

21. The DFE of claim 18, wherein each adder circuit of the plurality of adder circuits, respective comparator circuits of the plurality of comparator circuits, respective multiplier circuits, and respective slicer circuits of the plurality of slicer circuits form respective adder and slicer circuits of a plurality of adder and slicer circuits.

22. The DFE of claim 21, wherein each adder and slicer circuit of the plurality of adder and slicer circuits comprises:

an input stage circuit having a first output node, the input stage circuit configured to receive the input signal, a respective threshold signal, and respective correction coefficients, the input stage circuit configured to generate a first signal at the first output node;

a regeneration latch circuit having a second output node, the regeneration latch circuit having an input coupled to the first output node; and an output latch circuit coupled to respective output terminal of the DFE, the output latch circuit having an input coupled to the second output node.

23. The DFE of claim 22, wherein each input stage circuit comprises:

a first plurality of differential pairs coupled to the first output node, each differential pair of the first plurality of differential pairs configured to receive respective correction coefficients;

a plurality of enable switches coupled in series with respective differential pairs of the first plurality of differential pairs, wherein each enable switch of the plurality of enable switches is controlled based on voltages of respective output terminals of the DFE;

a second differential pair coupled to the first output node, the second differential pair configured to receive the input signal; and a third differential pair coupled to the first output node, the third differential pair configured to receive the respective threshold signal.

24. The DFE of claim 18, wherein the plurality of symbols comprises a plurality of pulse-amplitude modulation with four levels (PAM-4) symbols.

25. The DFE of claim 24, wherein:

the plurality of adder circuits comprises a high adder circuit, a center adder circuit, and a low adder circuit;

the plurality of comparator circuits comprises a high comparator circuit coupled to the high adder circuit, a center comparator circuit coupled to the center adder circuit, and a low comparator circuit coupled to the low adder circuit;

the plurality of slicer circuits comprises a high slicer circuit coupled to the high comparator circuit, a center slicer circuit coupled to the center comparator circuit, and a low slicer circuit coupled to the low comparator circuit, the high slicer circuit configured to produce a high data bit, the center slicer circuit configured to produce a center data bit, and the low slicer circuit configured to produce a low data bit;

the plurality of correction coefficients comprises a high-high correction coefficient, a high-center correction coefficient, a high-low correction coefficient, a center-high correction coefficient, a center-center correction coefficient, a center-low correction coefficient, a low-high correction coefficient, a low-center correction coefficient, and a low-low correction coefficient; and the plurality of multiplier circuits comprises a high-high multiplier circuit configured to multiply the high data bit times the high-high correction coefficient, a high-center multiplier circuit configured to multiply the center data bit times the high-center correction coefficient, a high-low multiplier circuit configured to multiply the low data bit times the high-low correction coefficient, a center-high multiplier circuit configured to multiply the high data bit times the center-high correction coefficient, a center-center multiplier circuit configured to multiply the center data bit times the center-center correction coefficient, a center-low multiplier circuit configured to multiply the low data bit times the center-low correction coefficient, a low-high multiplier circuit configured to multiply the high data bit times the low-high correction coefficient, a low-center multiplier circuit configured to multiply the center data bit times the low-center correction coefficient, and a low-low multiplier circuit configured to multiply the low data bit times the low-low correction coefficient.

26. The DFE of claim 25, wherein a current symbol of the plurality of symbols has a second level and an immediately preceding symbol of the plurality of symbols has a first level, and wherein adjusting respective correction coefficients comprises:

when the first level corresponds to a highest voltage and the second level corresponds to the highest voltage, updating the high-high correction coefficient;

when the first level corresponds to a second highest voltage and the second level corresponds to the highest voltage, updating the high-center correction coefficient;

when the first level corresponds to a third highest voltage and the second level corresponds to the highest voltage, updating the high-low correction coefficient;

when the first level corresponds to the highest voltage and the second level corresponds to the second highest voltage, updating the center-high correction coefficient;

when the first level corresponds to the second highest voltage and the second level corresponds to the second highest voltage, updating the center-center correction coefficient;

when the first level corresponds to the third highest voltage and the second level corresponds to the second highest voltage, updating the center-low correction coefficient;

when the first level corresponds to the highest voltage and the second level corresponds to the third highest voltage, updating the low-high correction coefficient;

when the first level corresponds to the second highest voltage and the second level corresponds to the third highest voltage, updating the low-center correction coefficient; and when the first level corresponds to the third highest voltage and the second level corresponds to the third highest voltage, updating the low-low correction coefficient.

27. The DFE of claim 26, wherein the highest voltage corresponds to a first positive voltage, the second highest voltage corresponds to the first positive voltage divided by three plus a first constant, and the third highest voltage corresponds to a negative voltage.

28. The DFE of claim 27, wherein the first constant is non-zero.

29. A method of operating a decision feedback equalizer (DFE) in a communication system, the method comprising:

receiving an input signal carrying a plurality of symbols at an input terminal;

generating a corrected signal with an adder circuit coupled to the input terminal;

comparing the corrected signal with a plurality of thresholds by using a plurality of comparator circuits coupled to the adder circuit; and generating thermometer encoded data bits with a plurality of slicer circuits coupled to respective comparator circuits based on the corrected signal, wherein generating the corrected signal comprises:

multiplying each data bit of the thermometer encoded data bits times respective correction coefficients of a plurality of correction coefficients to produce a multiplication result, and subtracting, by the adder circuit, the multiplication result from the input signal, wherein the plurality of correction coefficients are independently adjusted based on a previously received symbol.

30. The method of claim 29, wherein adjusting the correction coefficients comprises adjusting a single correction coefficient of the plurality of correction coefficients without adjusting other correction coefficients of the plurality of correction coefficients when a new symbol is received at the input terminal of the DFE.

31. The method of claim 29, wherein the communication system transmit data using 4-level pulse amplitude modulation (PAM-4).

32. The method of claim 31, adjusting the correction coefficients comprises:

when a first level of an immediately preceding symbol of the plurality of symbols corresponds to a highest voltage, updating a high correction coefficient of the plurality of correction coefficients;

when the first level of the immediately preceding symbol of the plurality of symbols corresponds to a second highest voltage, updating a center correction coefficient of the plurality of correction coefficients; and when the first level of the immediately preceding symbol of the plurality of symbols corresponds to a third highest voltage, updating a low correction coefficient of the plurality of correction coefficients.

33. The method of claim 32, wherein the highest voltage corresponds to a first positive voltage, the second highest voltage corresponds to the first voltage divided by three plus a first constant, and the third highest voltage corresponds to a negative voltage.

34. The method of claim 29, wherein the communication system transmits data at data rates between 20 Gbps and 56 Gbps.

35. The method of claim 29, wherein the communication system comprises a wireline communication system.

* * * * *